(12) United States Patent
Nakamura et al.

(10) Patent No.: US 8,270,281 B2
(45) Date of Patent: Sep. 18, 2012

(54) OPTICAL PICKUP DEVICE AND OPTICAL DISC APPARATUS USING SAME

(75) Inventors: Toshiteru Nakamura, Yokohama (JP); Nobuo Nakai, Yokohama (JP); Shigeharu Kimura, Yokohama (JP)

(73) Assignee: Hitachi Media Electronics Co., Ltd., Iwate (JP)

( * ) Notice: Subject to any disclaimer, the term of this patent is extended or adjusted under 35 U.S.C. 154(b) by 0 days.

(21) Appl. No.: 12/956,135

(22) Filed: Nov. 30, 2010

(65) Prior Publication Data

US 2011/0182165 A1 Jul. 28, 2011

(30) Foreign Application Priority Data

Jan. 25, 2010 (JP) .................. 2010-012749

(51) Int. Cl.
G11B 7/00 (2006.01)
G11B 27/36 (2006.01)
G11B 20/18 (2006.01)
G11B 7/135 (2006.01)

(52) U.S. Cl. ........... 369/112.23; 369/44.41; 369/124.12; 369/44.37; 369/110.02; 369/112.05; 369/112.03; 369/53.35; 369/47.45

(58) Field of Classification Search ............. 369/112.23, 369/44.41, 124.12, 44.37, 110.02, 112.05, 369/112.03, 53.35, 47.45
See application file for complete search history.

(56) References Cited

U.S. PATENT DOCUMENTS

| | | | | |
|---|---|---|---|---|
| 6,700,842 B1* | 3/2004 | Nishi | ...................... | 369/44.41 |
| 2001/0028613 A1* | 10/2001 | Okamoto et al. | .......... | 369/44.25 |
| 2003/0053395 A1 | 3/2003 | Kadowaki et al. | | |
| 2003/0137915 A1* | 7/2003 | Shoji et al. | ................. | 369/59.25 |
| 2005/0199778 A1 | 9/2005 | Kadowaki et al. | | |
| 2006/0278807 A1* | 12/2006 | Nakao et al. | ............... | 250/201.5 |
| 2007/0097822 A1* | 5/2007 | Iwanaga | ....................... | 369/53.2 |
| 2008/0247298 A1 | 10/2008 | Ogata | | |
| 2009/0268584 A1 | 10/2009 | Kamisada et al. | | |
| 2010/0195467 A1* | 8/2010 | Ichiryu et al. | ................. | 369/100 |

FOREIGN PATENT DOCUMENTS

| | | |
|---|---|---|
| JP | 2004-281026 | 10/2004 |
| JP | 2006-344344 | 12/2006 |
| JP | 2006-344380 | 12/2006 |
| JP | 2008-102998 | 5/2008 |

OTHER PUBLICATIONS

Kousei Sano, Novel One-beam Tracking Detection Method for Dual-Layer Blu-ray Discs, IEICE technical Report, CPM2005-149 (Oct. 2005), pp. 31-34.

* cited by examiner

Primary Examiner — Joseph Feild
Assistant Examiner — Aneeta Yodichkas
(74) Attorney, Agent, or Firm — Antonelli, Terry, Stout & Kraus, LLP.

(57) ABSTRACT

According to the present invention, of all beams of light reflected from the optical disc, only light in a peripheral region excluding a push-pull region is used to generate a DPD signal. In this method of signal generation that optimizes internal light-receiving surface interconnections in a photodetector, the lens error signal required for the generation of a tracking error signal in the DPP scheme is amplified at a lower amplification factor. In addition, the light reflected from the multilayered optical disc will be divided into a plurality of regions and the divided beam of light will be focused at different positions on the photodetector. When the beam is focused upon a desired layer, stray light from recording layers other than those to be subjected to information reproduction will not enter the photodetector light-receiving surfaces used for servo signals.

7 Claims, 15 Drawing Sheets

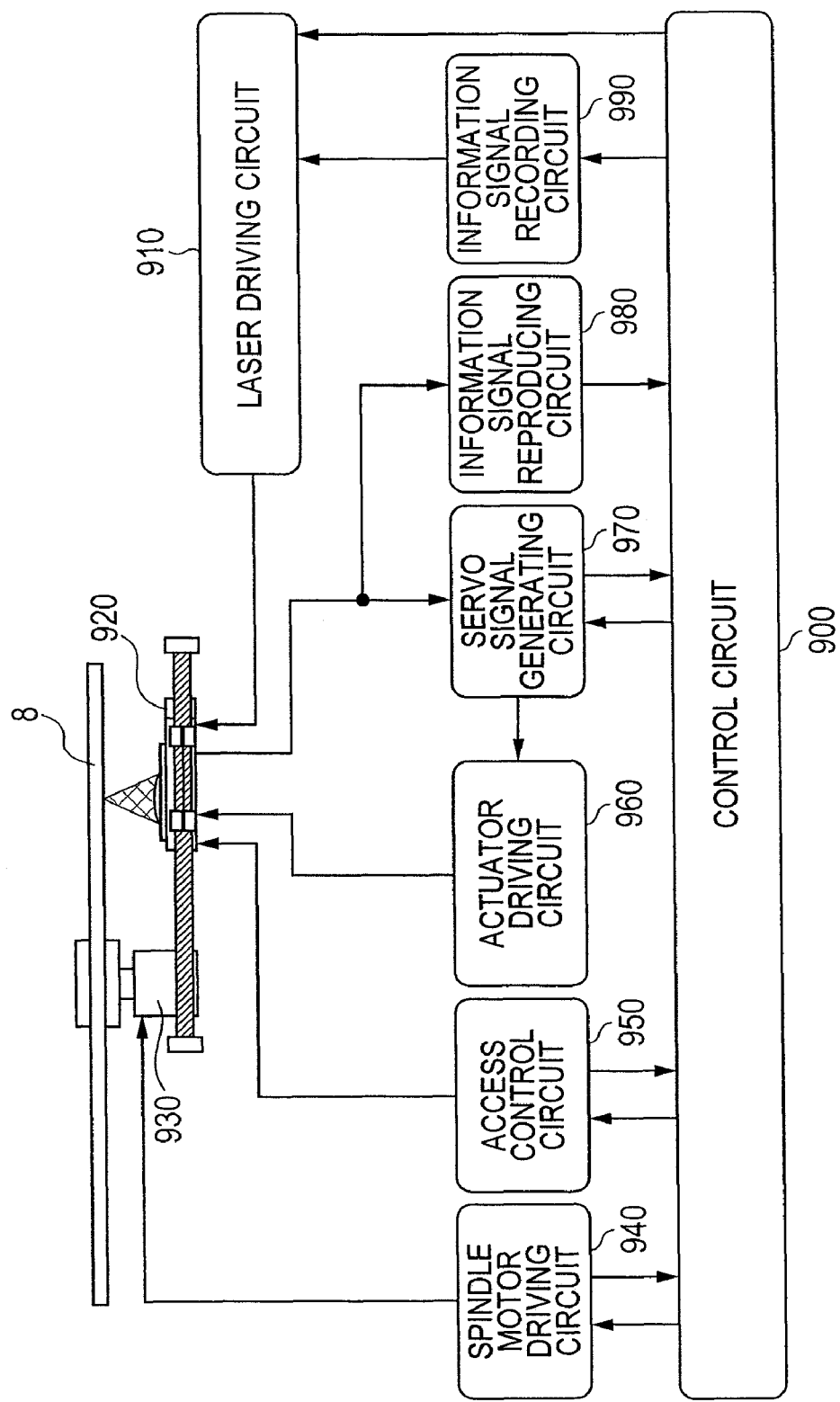

OPTICAL PICKUP DEVICE AND OPTICAL DISC APPARATUS USING SAME

CLAIM OF PRIORITY

The present application claims priority from Japanese patent application serial No. JP 2010-012749, filed on Jan. 25, 2010, the content of which is hereby incorporated by reference into this application.

BACKGROUND OF THE INVENTION (1) Field of the Invention

The present invention relates to an optical pickup device and an optical disc apparatus.

(2) Description of the Related Art

A technique concerned with the technical field of the present invention is described in, for example, JP-A-2006-344344, which discloses the technique as a "method of acquiring desired signals accurately from an optical disc having a plurality of recording layers". Another related technique is disclosed in JP-A-2006-344480, which discloses the technique as a "method of detecting a tracking error signal minimized in offset level, even when a recordable optical storage medium with two information-recording surfaces is used". Yet another related technique is described in, for example, IEICE Technical Bulletin CPM2005-149 (2005-10) that is a non-patent document (IEICE: the Institute of Electronics, Information and Communication Engineers). In CPM2005-149, the technique is introduced as a "method of disposing a tracking photodetector in a region free from any stray light leaking from other layers", and its related apparatus configuration is described in JP-A-2004-28102 as well as in the Technical Bulletin.

JP-A-2008-102998, for example, discloses a further, related technique as a "method of constructing various regions of a dividing element and a light-receiving section of a photodetector so that when a desired information-recording layer of an optical disc is focused, only the beam of light that is reflected from the desired information-recording layer will be converged upon the surface of the light-receiving section of the photodetector and no beam reflections from other information-recording layers will strike upon the light-receiving section of the photodetector".

SUMMARY OF THE INVENTION

In recent years, there exists the problem that when information is recorded on or reproduced from an optical disc having a multilayered recording region, the stray light reflected from a non-desired recording layer will reach the surface of a photodetector as incident light, which will then become a disturbance component and change a detection signal level attained by the photodetector. In optical discs with at least three recording layers, in particular, since an unwanted beam of light occurs on a plurality of layers, the disturbance component increases, thus further augmenting the change in the detection signal level. A solution to the above problem is proposed in JP-A-2008-102998, according to which document, stray light and signal light are separated from each other to suppress a change in detection signal level, by providing a dividing element having a plurality of regions, and dividing the beam reflected from the optical disc into a plurality of beams different in exit direction.

In the corresponding apparatus configuration, however, some of the signals used as tracking error signals of the differential push-pull (DPP) scheme need to be amplified to about 10 times an original signal level, and the amplification itself, in turn, significantly amplifies signal oscillation components due to the slight amount of stray light left by incomplete separation, or disturbance components such as flaws or dirt. This results in the amplified disturbance components leaking into the DPP signal, and hence makes it difficult to stably obtain high-quality recordings or high reproduction quality.

An object of the present invention is to provide an optical pickup device and optical disc apparatus adapted to generate a DPP signal while suppressing electrical signal amplification, significantly reduce leakage of disturbance components into detection signals, and stably obtain high-quality recordings or high reproduction quality. The invention is additionally intended to minimize the number of signal terminals constituting an interface of an optical pickup device in a signal detection scheme which makes signal amplification suppressible, and thus simplify a configuration of the apparatus. Accordingly, any stray light components of a multilayered disc that have leaked into lens error signals, and disturbance components such as disc flaws and dirt are restrained from being amplified by a signal amplifier, and detection of high-quality signals is implemented during reproducing/recording operations upon the multilayered optical disc.

The above object can be achieved by the invention described as one such example in the appended claims.

The present invention provides an optical pickup device and optical disc apparatus adapted to reduce any impacts of a disturbance due to stray light, upon detection signals, and detect high-quality signals.

BRIEF DESCRIPTION OF THE DRAWINGS

These and other features, objects and advantages of the present invention will become more apparent from the following description when taken in conjunction with the accompanying drawings, wherein:

FIG. 11 is a schematic diagram showing an example of an optical disc apparatus configuration in a sixth embodiment of the present invention.

DETAILED DESCRIPTION OF THE EMBODIMENTS

Hereunder, embodiments of the present invention will be described referring to the accompanying drawings. The constituent elements in each drawing that exhibit the same operation are each assigned the same reference number or symbol.
(First Embodiment)

Figure 1:
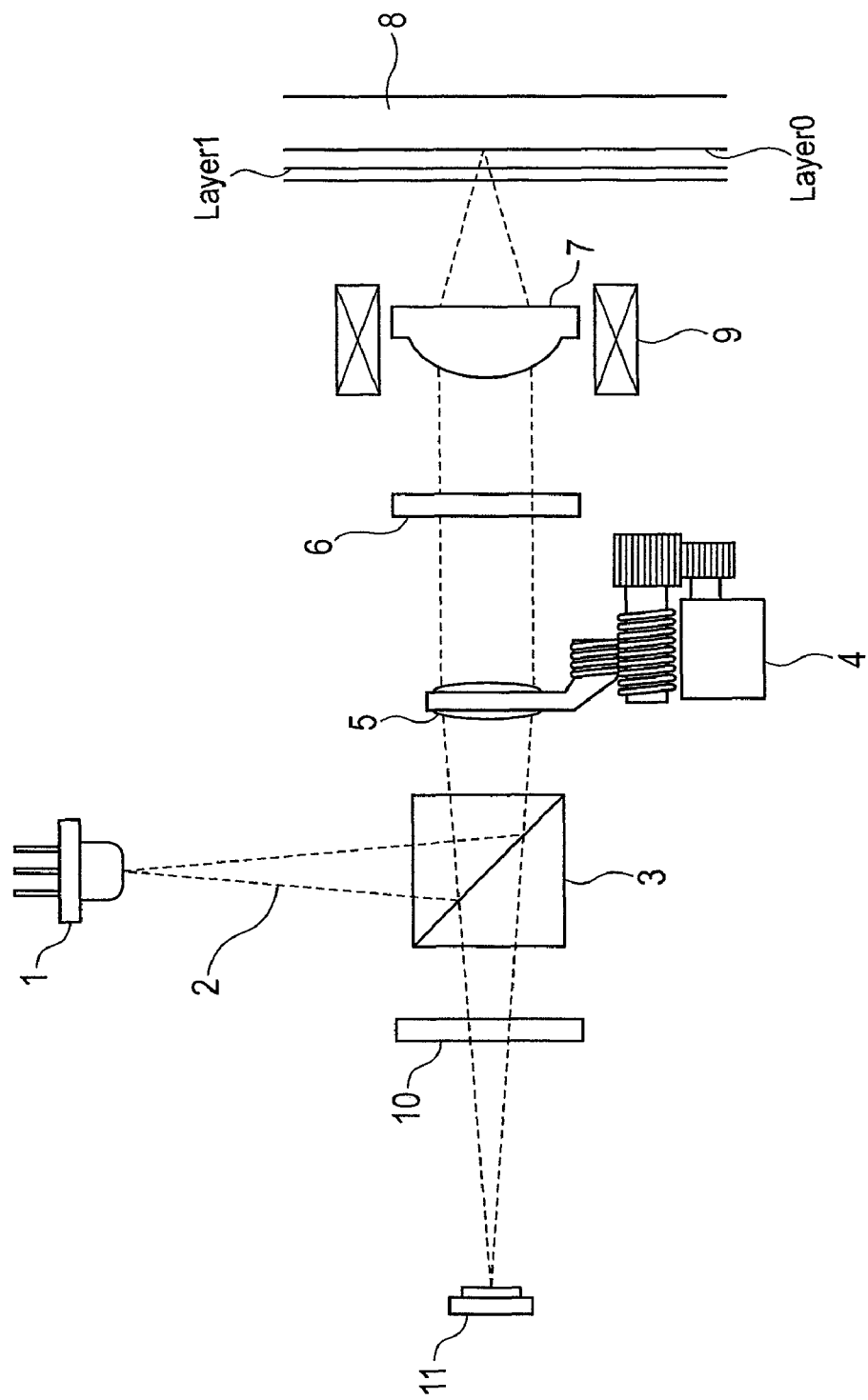
FIG. 1 is a schematic diagram showing an example of an optical pickup device configuration in a first embodiment of the present invention.

FIG. 1 is a schematic configuration diagram showing an example of an optical pickup device according to a first embodiment of the present invention. Upon exiting a laser light source 1, a laser beam 2 first has a traveling direction changed by a polarizing beam splitter 3, and then passes through a collimating lens 5 driven by a stepping motor 4 to correct any spherical aberration of the incident light. The collimated light further passes through a quarter-wave retarder 6 that imparts a 90-degree phase difference to polarized components orthogonal to each other. The phase-retarded laser light is finally converged on a predetermined recording layer within an optical disc 8 by an objective lens 7.

The beam of light, after being reflected from the optical disc 8, once again passes through the object lens 7, the quarter-wave retarder 6, and the polarizing beam splitter 3. Next, the beam is divided into a plurality of beams by a beam-dividing element 10 and then enters a photodetector 11. The objective lens 7 is desirably mounted in an actuator 9 that drives the lens 7 in a predetermined direction. Position control of the objective lens 7 is executed by driving the lens with the actuator. Position control of the objective lens 7 uses tracking control with a tracking error signal, and focus control with a focusing error signal. The spherical-aberration correcting element mentioned above can be a liquid crystal element or the like.

The above device configuration is of an optical-system scheme commonly used primarily for recording signals on or reproducing them from multilayered optical discs. Accordingly, more specific configurations of and problems associated with the beam-dividing elements and photodetectors in conventional examples are first described below.

Figure 2A:
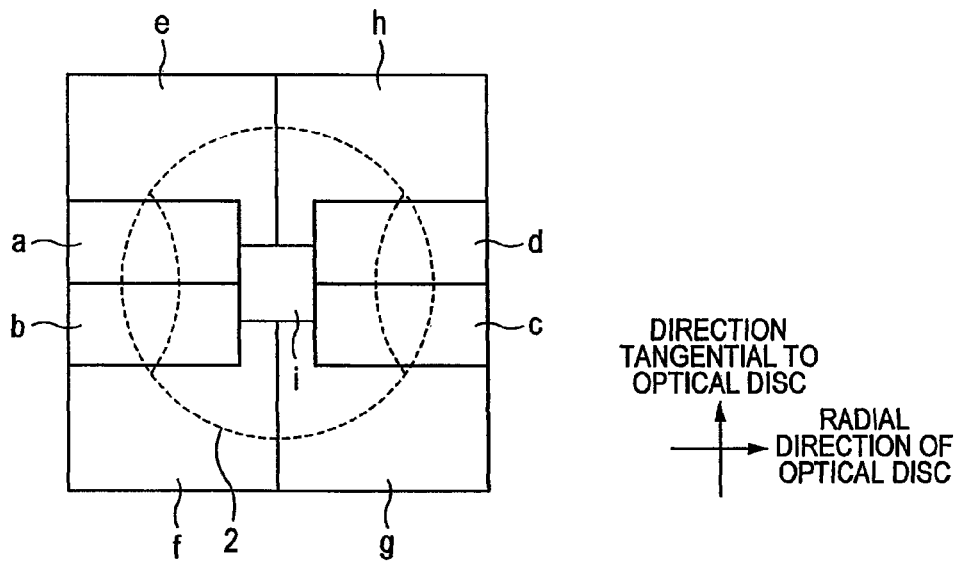
FIGS. 2A and 2B are schematic diagrams of beam-dividing elements in conventional examples.
Figure 2B:
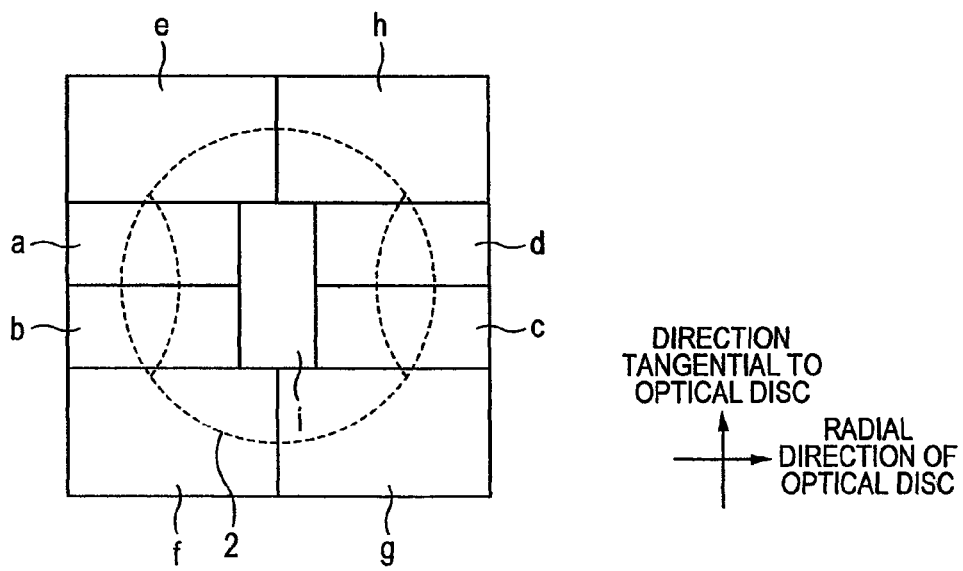

FIG. 2A shows an example of a schematic shape of the beam-dividing element 10 in one conventional example. It should be understood that the beam-dividing element is a diffraction grating and that the diffraction grating has a surface divided into a plurality of regions, with a predetermined, specific diffraction-grating groove shape formed in each region. The beam-dividing element 10 includes a plurality of diffraction regions, "a" to "i". The reflected beam from the optical disc undergoes diffraction by track grooves provided in a recording layer of the optical disc. Of the light diffracted by the disc, a 0th-order disc-diffracted light component including a central portion of the beam enters the diffraction region "i", 0th-order and +1st-order disc-diffracted light components enter the diffraction regions "a" and "b", respectively, and 0th-order and −1st-order disc-diffracted light components enter the diffraction regions "c" and "d", respectively. The diffraction region "a" adjoins the diffraction region "e". Likewise, the diffraction region "b" adjoins the diffraction region "f", the diffraction region "c" adjoins the diffraction region "g", and the diffraction region "d" adjoins the diffraction region "h". Light corresponding to a peripheral region of the 0th-order diffracted beam enters primarily the diffraction regions "e" to "h". Within a range appropriate for a relationship between the particular incident beam component and the diffraction region, a shape of the diffraction region may be changed and/or inter-regional integration or further regional dividing may be conducted. FIG. 2B shows a modification of the beam-dividing element. The above relationship is maintained between the diffraction region and the disc-diffracted light incident thereupon.

The beams of the diffraction regions "a" to "d" that are components of the +/−1st-order disc-diffracted light from the disc grooves include a push-pull (PP) signal component needed to generate a tracking error signal. The PP signal allows relative positions of the disc grooves and a converged beam spot to be detected. The beams of the diffraction regions "e" to "h" include a lens error signal component, which is also needed to generate the tracking error signal. The lens error signal becomes a signal proportional to a change in a position of an objective lens mounted in an actuator. The +1st-order light and −1st-order light that have been diffracted in each region are input in converged form to respective light-receiving surfaces in a photodetector 11, before being detected as signals.

Figure 3A:
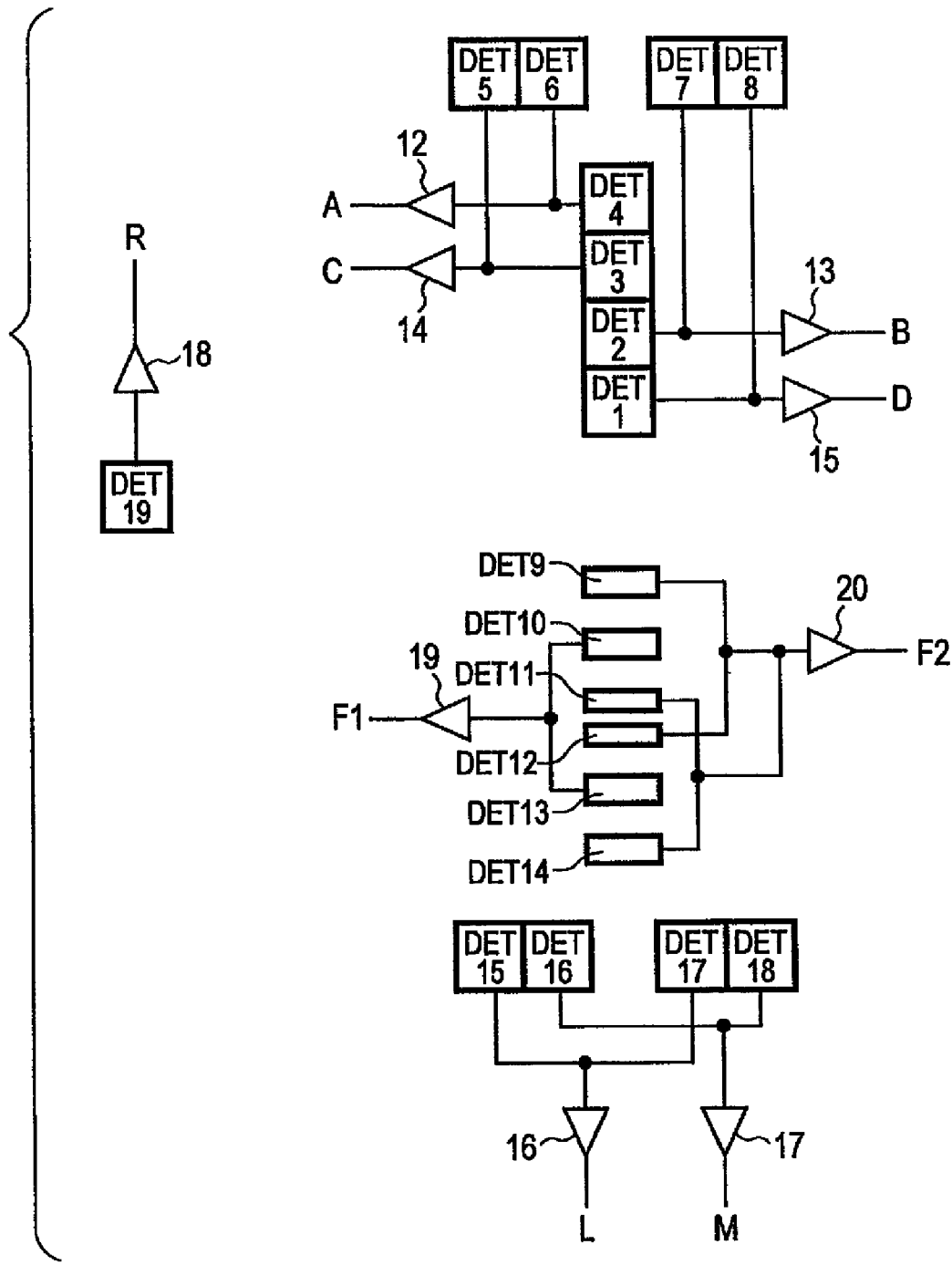
FIGS. 3A and 3B are schematic diagrams of photodetector configurations in the conventional examples.
Figure 3B:
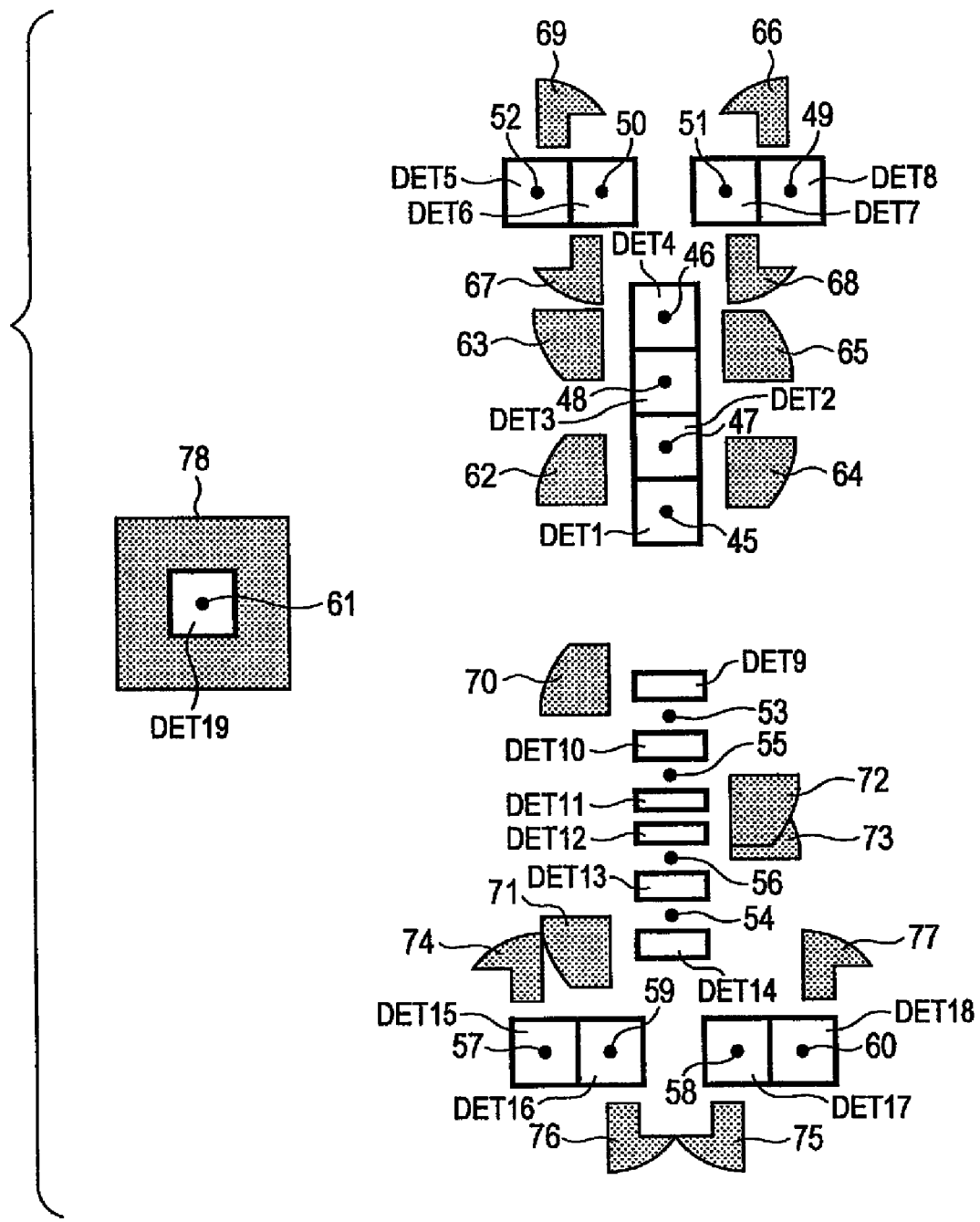

FIG. 3A is a schematic diagram that show a light-receiving surface pattern and signal interconnects of the photodetector 11 in the conventional example. FIG. 3B represents a luminous intensity distribution of a signal beam and stray light on the surface of the photodetector in the conventional example, the signal beam being the light reflected from the intended recording layer when information is recorded on or reproduced from the multilayered optical disc, and the stray light being the light reflected from a non-intended layer. Of all light beams that have passed through the diffraction regions "a", "b", "c", "d", "e", "f", "g", "h", "i", +1st-order beams enter the light-receiving surfaces DET 1, DET 4, DET 2, DET 3, DET 8, DET 6, DET 7, DET 5, DET 19, respectively, and form converged beam spots 45, 46, 47, 48, 49, 50, 51, 52, 61. The −1st-order beams of light that passed through the diffraction regions "e", "f", "g", "h" enter the light-receiving surfaces DET 15, DET 17, DET 16, DET 18, respectively, and form converged beam spots 57, 58, 59, 60. The −1st-order light that has passed through the diffraction regions "a", "b", "c", "d" enters a region of the light-receiving surfaces DET 9 to DET 14 for focus detection. However, using a double-knife-edge method to detect a focusing error signal is desirable, so during focus control, no light directly enters the light-receiving surfaces DET 9 to DET 14. Instead, each beam is input between any two of the light-receiving surfaces DET 9 to DET 14, forming converged beam spots 53 to 56. The tracking error signal is detected using the commonly used differential push-pull (DPP) method and differential phase detection (DPD) method.

As with the signal light, the stray light that has been reflected by a recording layer not used for information reproduction is divided into a plurality of beams by the beam-dividing element. In contrast to the signal light converged upon the photodetector surface, the stray light is out of focus, and unlike the signal light that forms spots, the stray light undergoes no convergence. Consequently, the stray light has a vague, luminous intensity distribution over a certain region. Of the stray light beams that have passed through the diffraction regions "a", "b", "c", "d", "e", "f", "g", "h", "i", +1st-order beams form spots 62, 63, 64, 65, 66, 67, 68, 69, 78, respectively. Of the stray light beams that have passed through the diffraction regions "e", "f", "g", "h", −1st-order beams form spots 74, 75, 76, 77, respectively. Of the stray light beams that have passed through the diffraction regions "a", "b", "c", "d", −1st-order beams form spots 70, 71, 72, 73, respectively. These characteristics prevent stray light from being input to the light-receiving surfaces, at the converged beam spots from the diffraction regions that are used for generating the tracking error signal, and suppress a change in detection signal level due to interference of stray light with the signal light.

Even during objective lens shifting, stray light can be easily avoided, provided that two or more light-receiving surfaces for detecting +1st-order grating-diffracted light or −1st-order grating-diffracted light in the diffraction regions "e" to "h" are arranged substantially in line in a direction nearly matching a direction equivalent to a radial direction of the optical disc, and that two or more light-receiving surfaces for detecting +1st-order grating-diffracted light or −1st-order grating-diffracted light in the diffraction regions "a" to "d" are arranged in a direction nearly matching a direction equivalent to a direction tangential to the optical disc.

The DPD signal and PP signal used as an information reproduction signal and the tracking error signal, are detected from +1st-order light detection signals. The focusing error signal and the lens error signal are detected from −1st-order light detection signals. The PP signal and the lens error signal are used to generate the DPP signal by a (pp signal−k* lens error signal) arithmetic operation, where "k" denotes an amplification factor of an amplifier.

More specifically, internal interconnections are formed and various signals are detected through arithmetic operations on the signals. That is to say:

a signal that is output via a current-voltage conversion amplifier 12 by internally interconnecting the light-receiving surfaces DET 4 and DET 6 is defined as A, a signal that is output via a current-voltage conversion amplifier 13 by internally interconnecting the light-receiving surfaces DET 2 and DET 7 is defined as B, a signal that is output via a current-voltage conversion amplifier 14 by internally interconnecting the light-receiving surfaces DET 3 and DET 5 is defined as C, a signal that is output via a current-voltage conversion amplifier 15 by internally interconnecting the light-receiving surfaces DET 1 and DET 8 is defined as D, a signal that is output via a current-voltage conversion amplifier 16 by internally interconnecting the light-receiving surfaces DET 15 and DET 17 is defined as L, a signal that is output via a current-voltage conversion amplifier 17 by internally interconnecting the light-receiving surfaces DET 16 and DET 18 is defined as M, a signal that is output from the light-receiving surface DET 19 via a current-voltage conversion amplifier 18 is defined as R, a signal that is output via a current-voltage conversion amplifier 19 by internally interconnecting the light-receiving surfaces DET 10 and DET 13 is defined as F1, and a signal that is output via a current-voltage conversion amplifier 20 by internally interconnecting the light-receiving surfaces DET 9, DET 11, DET 12, and DET 14 is defined as F2.

Servo control signals in addition to the information reproduction signal can be obtained from the above output signals by the following arithmetic operations:

PP signal=(A+D)−(B+C),

Lens error signal=L−M,

DPP signal=PP signal−k* lens error signal=(A+D)−(B+C)−k*(L−M),

Focusing error signal=F1−F2,

DPD signal=(Phase comparison between A and B)+(Phase comparison between C and D), Information reproduction signal=A+B+C+D+R.

In the above conventional photodetector, signal detection is achieved by interconnecting light-receiving surfaces inside the photodetector before providing current-voltage conversion amplifiers, not by providing an independent current-voltage conversion amplifier for each light-receiving surface. Thus, the number of current-voltage conversion amplifiers is reduced to obtain a necessary signal-to-noise (S/N) ratio for the detection of the information reproduction signal. Noise components can be reduced more significantly with less current-voltage conversion amplifiers. In addition, in the double-knife-edge method used for focus detection, since a dark-line region provided in a light-receiving surface deteriorates in frequency characteristics of signal detection, it is desirable that a signal from that light-receiving surface should not be used to detect the information reproduction signal. In the conventional photodetector, therefore, the +1st-order light and the −1st-order light are distributed at a ratio of about 4:1 in terms of luminous intensity to provide the +1st-order light with greater weighting, and the information reproduction signal is detected only from the +1st-order light side of higher luminous intensity, and under the current-voltage conversion amplifier arrangement in which the number of amplifiers is reduced by internal interconnection. The focusing error signal is detected using the −1st-order light of lower luminous intensity. Hence, the beam-dividing element commonly uses a diffraction grating blazed so that the luminous intensity of the +1st-order light is greater than that of the −1st-order light. More specifically, the diffraction regions of the beam-dividing element have a (0th-order light: +1st-order light: −1st-order light) diffraction efficiency of about 0:4:1.

Problems with the conventional example are discussed below. A first problem with the conventional example is that since the lens error signal absolutely needs to be detected from the −1st-order light of lower luminous intensity, the signal requires significant electrical amplification with an amplifier after being detected at the light-receiving surface. The light-receiving surfaces are arranged so that in terms of geometric optics, no stray light enters the light-receiving surfaces of the multilayered disc. In wave-optical terms, however, stray light is difficult to completely separate from the signal beam and will therefore have certain luminous-intensity components over a wide range, for which reason, there exist stray light components, although in slight quantities, that will enter the light-receiving surface. In particular, in multilayered discs with a narrow interlayer spacing and including a plurality of recording layers that cause stray light to occur, the luminous intensity distribution of stray light on the photodetector surface becomes very complex, which makes the stray light very difficult to completely separate from the signal light. Therefore, stray light easily enters the light-receiving surface, and the stray light becomes a disturbance component, causing a change in detection signal level. This change in detection signal level due to the multilayer stray light will be significantly amplified by the amplifiers in the device configuration of the conventional example and the amplified change will leak into the DPP signal. For the optical pickup of the convention configuration, the lens error signal detected from the −1st-order light tends to change in actual level in multilayered optical discs. In addition to the signal level change due to the multilayer stray light, if a disturbance component such as a flaw or dirt leaks into the lens error signal, this disturbance component will be significantly amplified by the amplifiers, causing significant deterioration of recording or reproduction quality. The conventional example is thus problematic in that the lens error signal is very sensitive to various disturbances.

A lens shift signal component is likewise detectable from the beam spots of the +1st-order light in the diffraction regions "e" to "h". If the detection is actually possible, there will be no luminous intensity difference equivalent to diffraction efficiency, and this characteristic will render the amplification factor controllable to a small value. In addition, the −1st-order light of lower luminous intensity is susceptible to a manufacturing error in the diffraction grating, this characteristic also posing the problem that diffraction efficiency significantly varies between the regions of the beam-dividing element. Variations in diffraction efficiency cause a DPP signal offset and reduce recording or reproduction quality. Using only the +1st-order light of higher luminous intensity to generate the DPP signal is desirable partly in terms of minimizing the variations in diffraction efficiency. To detect the DPD signal, however, it is necessary to detect four signals, namely, a sum signal between the diffraction regions "a" and "e", a sum signal between the diffraction regions "b" and "f", a sum signal between the diffraction regions "c" and "g", and a sum signal between the diffraction regions "d" and "h". Accordingly, if all signals are to be detected only by arithmetic operations through independent current-voltage conversion amplifiers without interconnecting the signal lines required for PP and DPD signal generation, detecting the information reproduction signal will require arranging nine current-voltage conversion amplifiers and this amplifier arrangement will deteriorate S/N characteristics very significantly. In order to avoid this problem, the number of current-voltage conversion amplifiers is reduced to five by internal interconnection to achieve both of PP and DPD signal detection and information reproduction signal detection with less noise. In the above configuration, the +1st-order beam signal component of the lens shift signal to be originally subtracted from the PP signal during DPP signal computation is added to the PP signal. For this reason, the lens error signal cannot be detected from the +1st-order light and inevitably needs to be detected from the −1st-order light of lower luminous intensity. The luminous intensity difference equivalent to diffraction efficiency, and the lens shift signal component of the +1st-order light are added to PP and this addition results in the very large amplification factor "k" of about 10.

As described heretofore, since the number of current-voltage conversion amplifiers in the device configuration of the conventional example is to be reduced to detect the DPD signal and to obtain the necessary S/N characteristics, the amplification factor "k" required for the generation of the DPP signal amounts to as great as about 10. Accordingly, in the optical pickup device of the present embodiment, an amplification factor of amplifiers required for DPP signal generation is significantly reduced to a range of about 1 to 2 by introducing a new method of DPD signal detection, and at the same time, various signals whose quality is equivalent to that of the signals generated in the conventional example can be obtained. For these reasons, the optical pickup device of the present embodiment is highly resistant to disturbances due to multilayer stray light, variations in diffraction efficiency of a diffraction grating, flaws, and other unwanted factors. Additionally, the device is high in manufacturing yield and provides high-quality recording/reproduction signals stably.

First, the new method of DPD signal detection in the present embodiment is described below. In the conventional DPD method, the DPD signal is detected using practically all signal beam regions, as described above. By contrast, in the present embodiment, attention is focused only upon peripheral regions of the signal beam, except for a PP signal region of the signal beam. More specifically, it was studied whether a DPD signal can be detected even with only the beams obtained at beam peripheral regions equivalent to diffraction regions "e" to "h". After the studies, it was found that even with only the beams obtained at the peripheral regions, a high-quality DPD signal can be detected for the reason discussed below. During DPD signal detection, a change in luminous intensity is not in itself detected as a signal. Instead, a difference in the timing that the luminous intensity changes (i.e., a phase difference) is detected and a variation in the phase difference is acquired as a signal, so even when the luminous intensity or a part of the beam regions decreases, once the above timing has been detected, the DPD signal can be detected. In the conventional example, DET 1-8, DET 2-7, DET 3-5, and DET 4-6 internal interconnections have been absolutely necessary for the reduction of current-voltage conversion amplifiers. The new DPD signal detection method in the present embodiment, however, made it clear that even without conducting these internal interconnections, the DPD signal can be detected with only signals from the light-receiving surfaces DET 5, DET 6, DET 7, and DET 8 into which the beams of the peripheral regions pass. Since the new DPD signal detection method in the present embodiment made the above internal interconnections unnecessary, the signals from the light-receiving surfaces DET 5, DET 6, DET 7, and DET 8, can be used to create a lens error signal and detect the DPD signal, at a +1st-order light beam side of higher luminous intensity. The amplification factor of the amplifiers can therefore be reduced significantly. More specifically, the amplification factor can be significantly reduced to nearly 1.5.

Figure 4A:
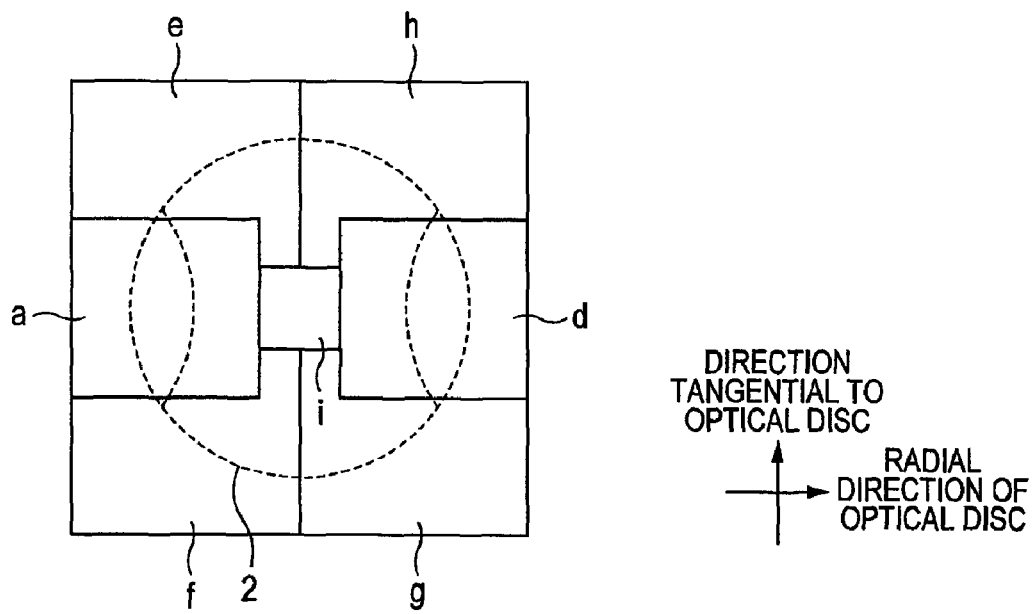
FIGS. 4A and 4B are schematic diagrams of beam-dividing element configurations in the first embodiment.
Figure 4B:
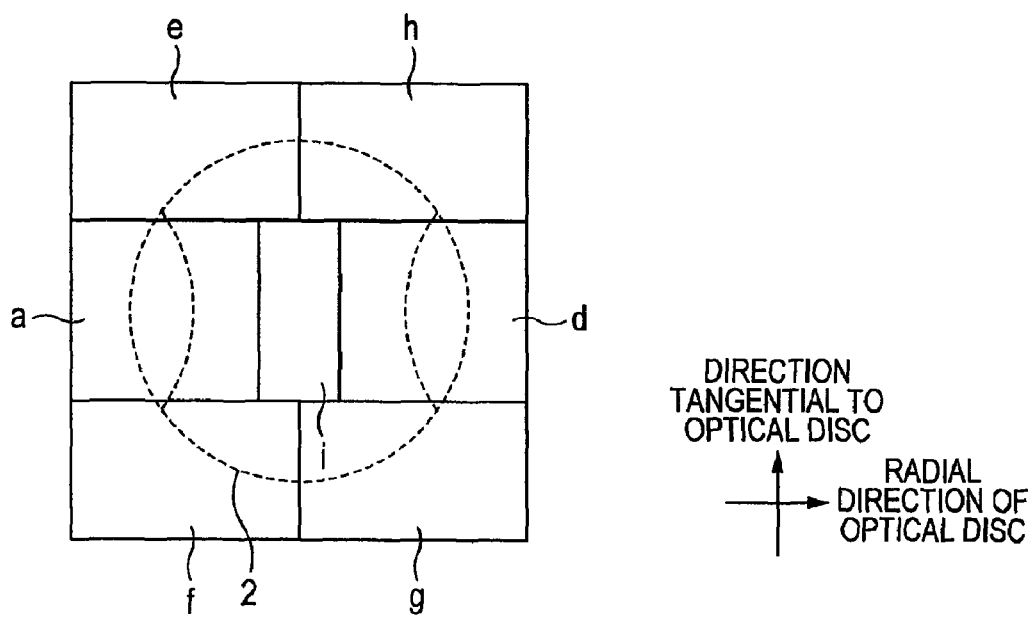

More specific configurations of the present embodiment are described below. FIGS. 4A and 4B are schematic diagrams that show configurations of the beam-dividing element 10 in the present embodiment. Diffraction regions "b" and "c", although they lie within the range of variants of the conventional example, are formed integrally with diffraction regions "a" and "d", respectively. Diffraction regions "e", "f", "g", and "h" desirably have substantially the same diffraction efficiency as that of the corresponding regions in the conventional example. The diffraction regions "a", "d" may have substantially the same diffraction efficiency as that of the corresponding regions in the conventional example, or may have such diffraction efficiency that a necessary quantity of light concentrates only upon a +1st-order beam of light.

It is desirable that second-order, third-order, and other higher-order beams of light diffracted from the above diffraction regions should be as small as possible in diffraction efficiency. However, it is difficult to design and manufacture a diffraction grating having a groove shape that completely zeroes the diffraction efficiency, and thus, beam spots of higher-order light will have luminous intensity, albeit the intensity will be of a slight level. Since these beams are unnecessary, each of them becomes a disturbance component of the detection signal. If the diffraction efficiency of the diffraction regions "a", "d" can be obtained in a diffraction grating that concentrates the luminous intensity upon the +1st-order light only, this yields an advantage of the diffraction grating becoming easy to design for reduced luminous intensity of higher-order diffracted light, and this advantage allows the optical pickup device to detect higher-quality signals less susceptible to disturbances due to higher-order diffracted light. Diffraction region "i" can have substantially the same diffraction efficiency as that of a corresponding region in the conventional example.

Figure 5A:
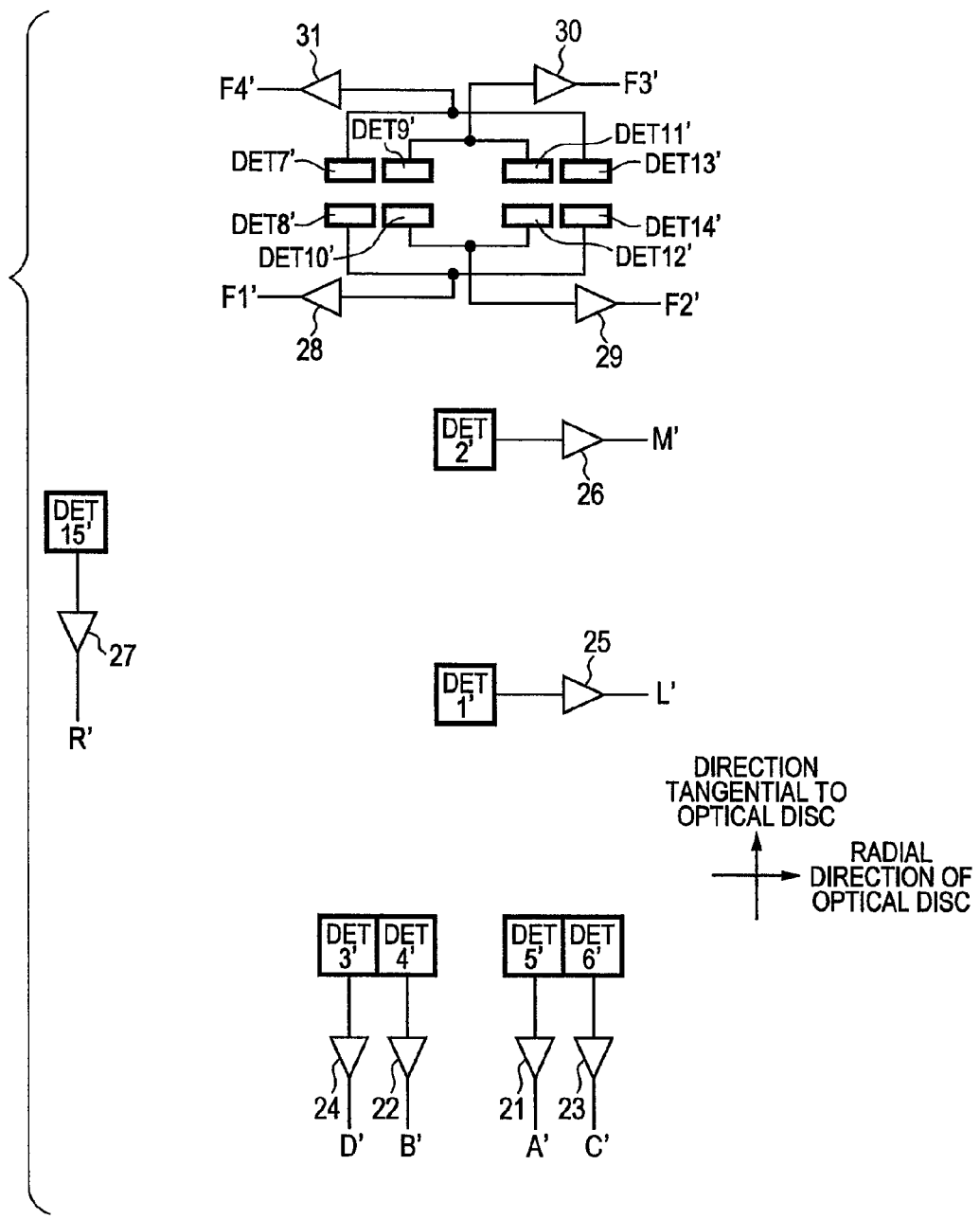
FIG. 5A is a schematic diagram of a photodetector configuration in the first embodiment.

FIG. 5A is a schematic diagram showing a light-receiving surface configuration and interconnecting method in the present embodiment. Of all beams that have passed through the diffraction regions "a", "d", "e", "f", "g", "h". "i", +1st-order beams of light enter the light-receiving surfaces DET 2', DET 3', DET 5', DET 4', DET 6', DET 15', respectively. The −1st-order beams of light that passed through the diffraction regions "e", "f", "g", "h" enter the light-receiving surfaces DET 7' to DET 14' for focus detection. However, using the double-knife-edge method to detect a focusing error signal is desirable, so during focus control, no signal beam directly enters the light-receiving surfaces DET 7' to DET 14'. Instead, each signal beam is input between any two of the light-receiving surfaces DET 7' to DET 14'.

Each signal can be obtained by arithmetic operations. That is to say:

a signal that is output from the light-receiving surface DET 5' via a current-voltage conversion amplifier 21 is defined as A', a signal that is output from the light-receiving surface DET 4' via a current-voltage conversion amplifier 22 is defined as B', a signal that is output from the light-receiving surface DET 6' via a current-voltage conversion amplifier 23 is defined as C', a signal that is output from the light-receiving surface DET 3' via a current-voltage conversion amplifier 24 is defined as D', a signal that is output from the light-receiving surface DET 1' via a current-voltage conversion amplifier 25 is defined as L', a signal that is output from the light-receiving surface DET 2' via a current-voltage conversion amplifier 26 is defined as M', a signal that is output from the light-receiving surface DET 15' via a current-voltage conversion amplifier 27 is defined as R', a signal that is output via a current-voltage conversion amplifier 28 by internally interconnecting the light-receiving surfaces DET 8' and DET 14' is defined as F1', a signal that is output via a current-voltage conversion amplifier 29 by internally interconnecting the light-receiving surfaces DET 10' and DET 12' is defined as F2', a signal that is output via a current-voltage conversion amplifier 30 by internally interconnecting the light-receiving surfaces DET 9' and DET 11' is defined as F3', and a signal that is output via a current-voltage conversion amplifier 31 by internally interconnecting the light-receiving surfaces DET 7' and DET 13' is defined as F4'.

Servo control signals in addition to the information reproduction signal can be obtained from the above output signals by the following arithmetic operations:

PP signal=L'−M',

Lens error signal=(A'+D')−(B'+C'),

DPP signal=PP signal−k* lens error signal=(L'−M')−k*{(A'+D')−(B'+C')},

Focusing error signal=(F1'+F3')−(F2'+F4'),

DPD signal=(Phase comparison between A' and B')+(Phase comparison between C' and D'), Information reproduction signal=A'+W+C'+D'+L'+M'+R'.

The present embodiment uses seven current-voltage conversion amplifiers. This number is greater than in the conventional example that has used five amplifiers. This difference of two units is of a level causing no significant signal deterioration and improvable by, for example, improving performance of the current-voltage conversion amplifiers themselves and/or optimizing other factors of the amplifiers, such as gain settings. Additionally, light-receiving sensitivity of the photodetector on each light-receiving surface is desirably set to be as high as possible. This is because assigning higher light-receiving sensitivity allows lower gain resistance to be assigned to the current-voltage conversion amplifiers, and deterioration of information reproduction signal quality due to thermal noise to be suppressed. However, since an increase in light-receiving sensitivity generally deteriorates frequency characteristics, light-receiving sensitivity is desirably set to stay in such a range that predetermined frequency characteristics can be satisfied. Furthermore, in perspective of noise and frequency characteristics, it is advantageous to, before transmitting the information reproduction signal from an independent output signal terminal of the optical pickup device, use a summing operational amplification circuit to add and amplify the signals required for the generation of the information reproduction signal (i.e., in the present embodiment, these signals are equivalent to the signals A', B', C', D', L', M', and R'). In this case, the information reproduction signal is more desirably output in a differential format through two signal lines to reduce noise. In addition, if a gain level that attenuates the signal is assigned to the summing operational amplification circuit and the particular amount of attenuation is compensated for with the amplification factor of the current-voltage conversion amplifiers, light-receiving sensitivity can be further enhanced and noise reduced more significantly.

For the focusing error signal, a configuration with a reduced number of terminals for signal output can likewise be obtained by performing internal interconnections between signal lines F1' and F3' and between signal lines F2' and F4'.

In addition, performing the internal interconnections reduces the number of output signals, which in turn reduces the number of interface signal terminals required and leads to providing a less expensive, simpler optical pickup device.

Furthermore, since the number of spots on the photodetector surface is reduced, forming the PP region from two diffraction regions and light-receiving surfaces corresponding to these diffraction regions facilitates photodetector adjustment, providing an advantage that the manufacturing yield of the device can be improved.

The beam-dividing element 10 may be disposed between the polarizing beam splitter 3 and quarter-wave retarder 6 midway on the two-way path. The distance between the photodetector and the beam-dividing element will then be longer, which will yield an advantage that a necessary diffraction grating pitch can be spread for easier fabrication of the element. An effective beam diameter on the diffraction grating surface will also be greater and detection levels of various signals with respect to a shift in a position of the element will be gentler. In order to prevent the beam-dividing element from acting upon the light entering the optical disc, the diffraction grating of the beam-dividing element is desirably a polarizing diffraction grating with a polarizing capability so that the beam-dividing element acts only upon the light returned from the optical disc.

Next, an interface configuration required for signal transmission between the optical pickup device and optical disc apparatus of the present embodiment is described below. The interface can be of a configuration having at least 12 signal terminals: 4 for output of the signals A', B', C', D' required for the generation of the DPD signal and lens error signal detected from light in the beam periphery, 2 for output of the signals L', M' required for the generation of the PP signal, 4 for output of the signals F1', F2', F3', F4' required for the generation of the focusing error signal, and 2 for output of the information reproduction signal.

The above description is limited to an interface configuration of an essential part of the present embodiment, the essential part relating to servo signals and the information reproduction signal. In addition to the essential part, a spherical aberration corrector, an actuator drive, and other interfaces may be added to the optical pickup device. In addition, the number of signals to be output increases unless the internal interconnections in the photodetector are performed, so an appropriate number of signal terminals may be added according to the particular increase. An increase in the number of spots on the light-receiving surfaces, that is, an increase in the number of light-receiving surfaces, due to an increase in the number of beams into which one beam is to be divided by the beam-dividing element, also increases the number of output signals, in which case, an appropriate number of signal terminals may also be added according to the particular increase.

Next, a compatible-type optical pickup device applicable to recording information on or reproducing information from a blue/near-blue optical disc represented by Blu-ray discs, and to recording information on or reproducing information from a red/near-red optical disc represented by DVDs and CDs, is considered below. Briefly, the three-wave compatible optical pickup device here means a device applicable to three types of recording or reproducing media of different wavelengths. In general, blue/near-blue laser light sources have high coherence and are easily and prominently affected by interference due to stray light. Accordingly, the three-wave compatible optical pickup device considered herein has a configuration applied to an optical system for recording information on or reproducing information from a blue/near-blue optical disc. In this device configuration, optical systems for red/near-red optical discs less susceptible to interference can be constructed by adopting as a general, astigmatic optical system configuration. In an interface configuration of the three-wave compatible optical pickup device, an increase in the number of signal terminals can be suppressed as follows:

First, the optical systems for two types of red/near-red optical discs can both be astigmatic detection systems of a general configuration, such that since the output signals obtained are the same, the two optical systems can share one interface. More specifically, the interface can be configured with 10 signal terminals: 4 for output of the signal components used to generate main PP and focusing error signals and to generate the DPD signal, 4 for output of the signal components used to generate a sub-PP signal and the focusing error signal in the differential astigmatic detection (DAD) scheme, and 2 for output of the signal components used to generate the information reproduction signal.

Next, for signal output pin sharing between the blue optical system and red optical system used in the configuration of the present embodiment, the DPD signal terminals through which high-frequency signals are to be conducted, desirably take higher priority for the sharing, from a standpoint of signal transmission characteristics. Accordingly, the signals lines A', B', C', D' through which the DPD signal components are to be conducted, and the four signal terminals for generating red/near-red disc DPD signals are more desirably made common in specifications to ensure matching in polarity. The two signal terminals for output of the information reproduction signal can also be formed to have the commonality in specifications. In addition, the four signal terminals for output of the blue focusing error signal components can be shared with, after being matched in polarity with, the four signal terminals for output of the signal components used to generate the sub-PP and DAD signals in the red optical system. The interface with the number of signal terminals reduced to a total of 14, therefore, can be constructed in a three-wave compatible optical pickup device. The optical disc apparatus with the optical pickup device mounted therein generates predetermined signals in association with the signal terminals of the common specifications by selecting a mode according to the type of optical disc used.

Figure 5B:
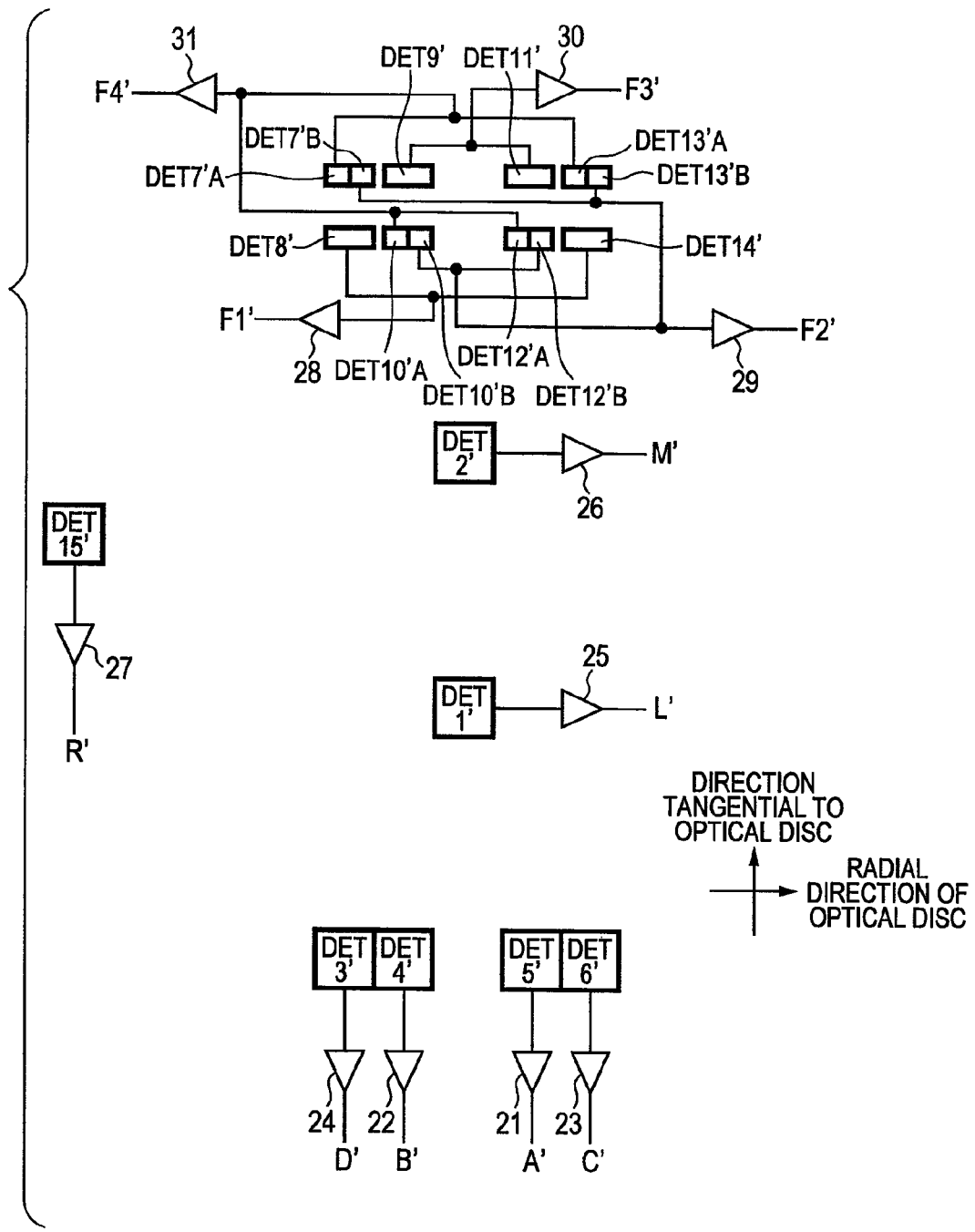
FIG. 5B is a schematic diagram of the photodetector configuration that enables detection of shifts in positions of the photodetector and beam spot in the first embodiment.

Dividing each light-receiving surface of the photodetector into even smaller regions to adjust a position of the photodetector allows photodetector position adjusting signal detection. Accordingly, the light-receiving surfaces of the photodetector may be arranged as shown in FIG. 5A. The photodetector light-receiving surface layout pattern and layout rules are set up to obtain the photodetector position adjusting signal by providing a dividing line on part of the light-receiving surfaces, and dividing each corresponding surface into smaller regions, without departing from a range of the photodetector pattern and layout rules described heretofore. Referring to FIG. 5B, the light-receiving surfaces DET 7', DET 10', DET 12', DET 13' for detecting the focusing error signal are each divided into smaller regions. Therefore, only the output signal lines F1', F2', F3', F4' for generating the focusing error signal need to be changed.

As shown in FIG. 5B, the light-receiving surface DET 7' is divided into two light-receiving surfaces, namely DET 7'A and DET 7'B, by providing one dividing line in a direction tangential to the optical disc, on DET 7'. Similarly, the light-receiving surfaces DET 10', DET 12', DET 13' are each divided in two to form light-receiving surfaces DET 10'A and DET 10'B, DET 12'A and DET 12'B, and DET 13'A and DET 13'B, respectively, by providing one dividing line in the direction tangential to the optical disc, on each light-receiving surface.

Each signal can be obtained by arithmetic operations. That is to say:

a signal that is output via the current-voltage conversion amplifier 28 by internally interconnecting the light-receiving surfaces DET 8' and DET 14' is defined as F1', a signal that is output via the current-voltage conversion amplifier 29 by performing internal interconnections between the light-receiving surfaces DET 7'B and DET 10'B and between the light-receiving surfaces DET 12'B and DET 13'B, is defined as F2', a signal that is output via the current-voltage conversion amplifier 30 by internally interconnecting the light-receiving surfaces DET 9' and DET 11' is defined as F3', and a signal that is output via the current-voltage conversion amplifier 31 by performing internal interconnections between the light-receiving surfaces DET 7'A and DET 10'A and between the light-receiving surfaces DET 12'A and DET 13'A, is defined as F4'.

Signals for detecting any shifts in the position of the photodetector with respect to beam spots can be obtained by performing predetermined arithmetic operations using the signals F1' to F4'. The focusing error signal can be detected by (F1'+F3')−(F2'+F4') computation.

Neither the number of signals output, nor a method of computation for the signals obtained after being output is changed in the photodetector configuration of FIG. 5B. The interface of the optical pickup device that covers a range including the compatibility with red/near-red optical discs can therefore be configured using substantially the same method as that of the above interface. The light-receiving surface dividing method described above, however, is not limited to the above.

For ease in avoidance of affection of stray light, it is desirable that the layout of the light-receiving surfaces be based upon the basic configuration in the conventional example. Therefore, at least two light-receiving surfaces for detecting the +1st-order grating-diffracted light or −1st-order grating-diffracted light in the diffraction regions "e" to "h" are desirably arranged substantially in line in a direction substantially matching a direction equivalent to a radial direction of the optical disc. Similarly, at least two light-receiving surfaces for detecting the +1st-order grating-diffracted light or −1st-order grating-diffracted light in the diffraction regions "a" to "d" are desirably arranged substantially in line in a direction substantially matching the direction tangential to the optical disc. The layout of the light-receiving surfaces, therefore, is not limited to the layout patterns shown in FIGS. 5A and 5B. Unless a change is conducted upon association between the beam from one diffraction region and the light-receiving surface which the beam is to enter, the layout position of each light-receiving surface may be changed. The beam is desirably made to enter the associated light-receiving surface, by adjusting a diffracting direction and angle of the beam-dividing element according to the particular change in the layout position. Since the light-receiving surfaces for detecting the focusing error signal are not used to detect the information reproduction signal or other control signals, any changes and modifications such as adding light-receiving surfaces, changing internal interconnections, and adding output signals and current-voltage conversion amplifiers, in addition to changing and adding light-receiving surface pattern positions, may be freely conducted.

Adoption of the configuration described above allows the PP signal and the lens error signal to be detected at the +1st-order light side of higher luminous intensity, and the DPD signal to be detected, and thus allows the lens error signal to be detected from the +1st-order light side at which the same diffraction efficiency as that of the PP signal can be obtained. Thus, the amplification factor of the amplifiers can be significantly reduced to about 1.5. Consequently, the optical pickup device becomes more resistant to interference-causing changes in optical signal level due to multilayer stray light, to flaws and dirt on the optical disc, and to various other disturbances and fluctuations, can also suppress signal deterioration due to nonuniformity of diffraction efficiency, and provides stable, high recording/reproducing signal quality.

(Second Embodiment)

A second embodiment is described below using FIG. 6. In the present embodiment, using a beam-dividing element that is easier to manufacture than in the first embodiment suppresses nonuniformity of mass production of the beam-dividing element, thus stabilizing independent performance of the element itself, improving a manufacturing yield of the optical pickup device, and reducing costs.

The optical pickup device in the present embodiment can take substantially the same optical system configuration as that of the optical pickup device shown in FIG. 1, for example. The beam-dividing element 10 and the photodetector 11 adopted in the second embodiment are different in construction from those in the first embodiment. The configuration of the photodetector 11, an essential part of the second embodiment, is described below using FIG. 6.

In the optical system configuration of the first embodiment, the diffraction grating pitch in the diffraction region "i" tends to be minimal. As the diffraction grating pitch becomes narrow, manufacturing errors easily change diffraction efficiency. This causes nonuniformity of performance between optical pickup devices, resulting in yield deterioration. Accordingly, the present embodiment includes a region having a rectangular grating to generate the +1st-order light and −1st-order light that become equal in luminous intensity only in the diffraction region "i". Compared with the blazed grating employed in the first embodiment, the rectangular grating is very easy to fabricate and suppresses the nonuniformity of performance significantly. Shapes of each diffraction region can be substantially the same as in the first embodiment.

Figure 6:
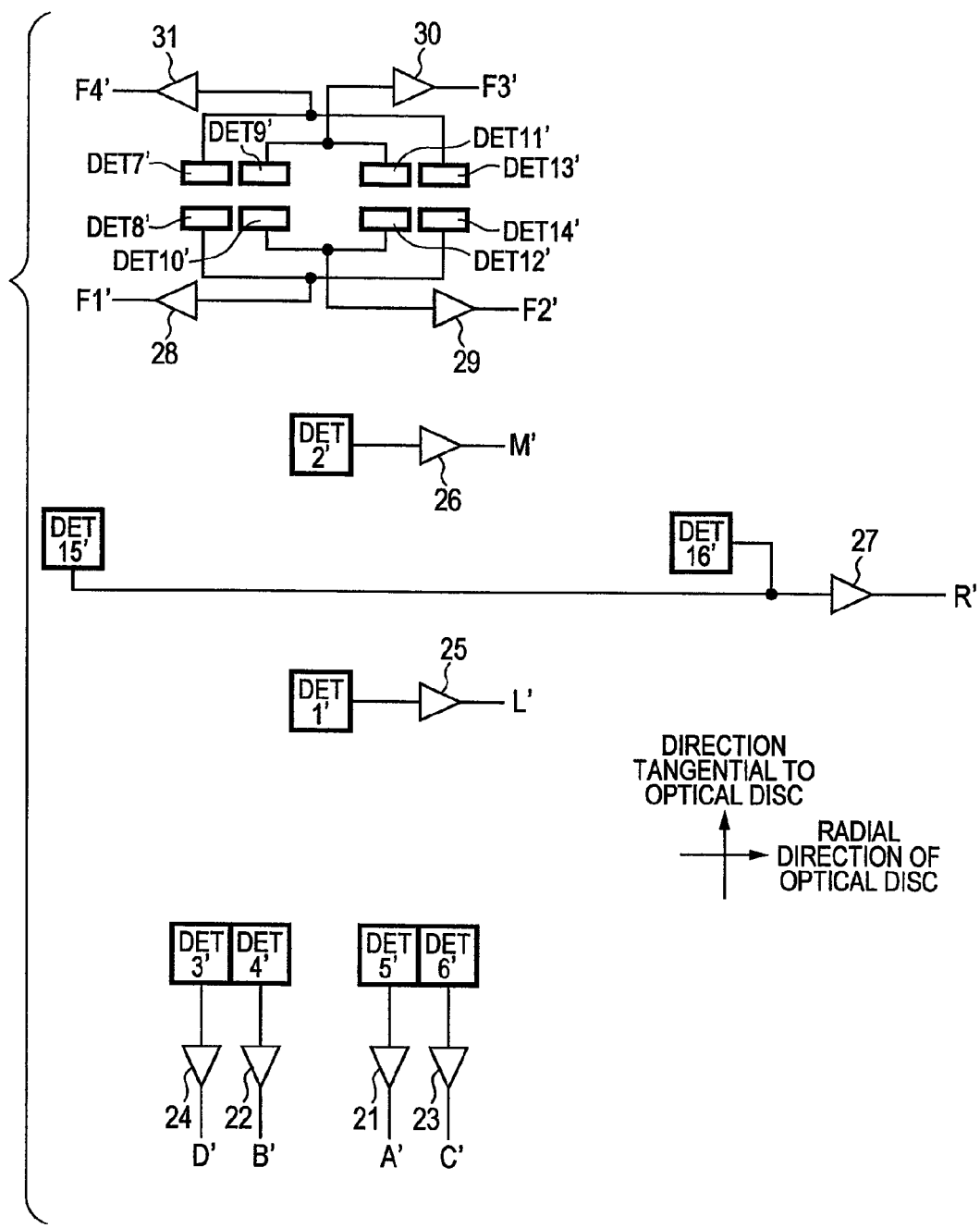
FIG. 6 is a schematic diagram of a photodetector configuration in a second embodiment.
Figure 7A:
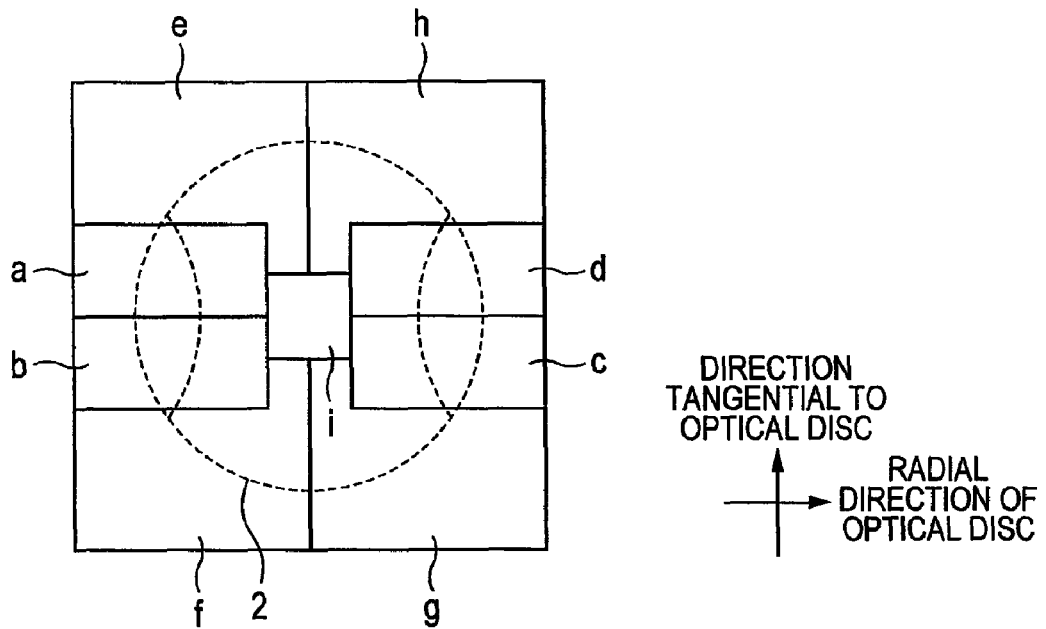
FIGS. 7A and 7B are schematic diagrams of beam-dividing element configurations in a third embodiment.
Figure 7B:
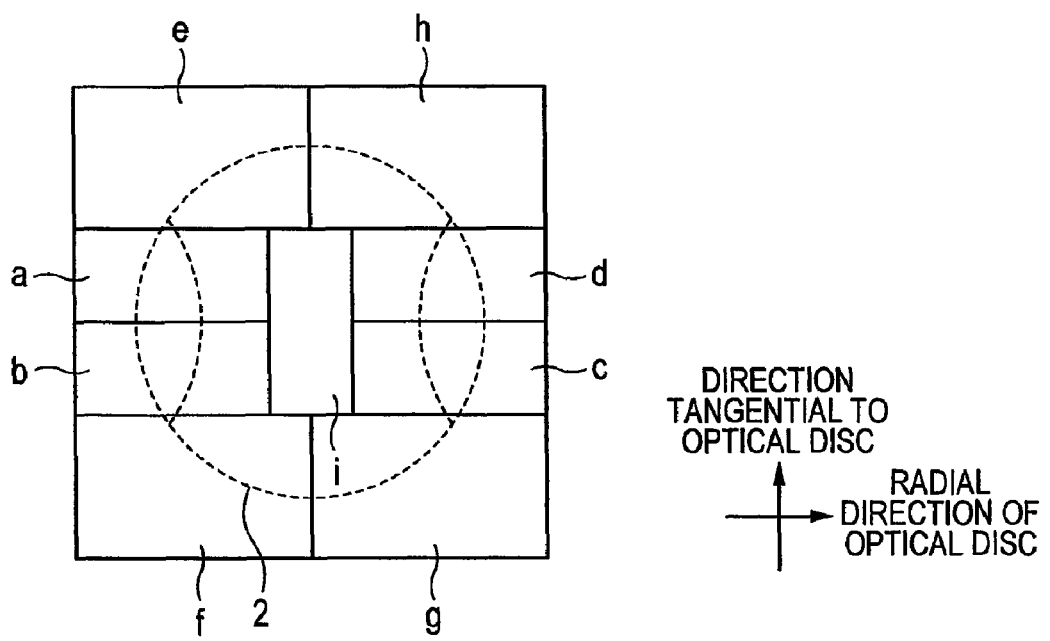

FIG. 6 shows a schematic diagram of the photodetector whose diffraction region "i" employs the rectangular grating. The difference from the first embodiment exists in a light-receiving surface configuration, and internal interconnections thereof, that receives light beams from the diffraction region "i". Since the amount of light is equally allocated to +/−1st-order beams with the diffraction region "i" as the rectangular grating, the luminous intensity of the +1st-order light decreases, compared with the equivalent in the first embodiment. For this reason, DET 16' is added and the −1st-order light of the diffraction region "i" that consequently increases in luminous intensity is also detected. In addition, the light that passes through between DET 15' and DET 16' can be output as the signal R' by internally interconnecting DET 15' and DET 16', so there is no need to add a current-voltage conversion amplifier.

Other diffraction regions can be made substantially the same as those of the first embodiment in terms of light-receiving surface—diffraction region association, internal interconnections, and signal level computing method. More specifically, of all beams of light that have passed through the diffraction regions "a", "d", "e", "f", "g", "h", only the +1st-order beams enter the respective light-receiving surfaces, namely, DET 1', DET 2', DET 3', DET 5', DET 4', and DET 6', respectively. Of all the beams of light that passed through the diffraction regions "e", "f", "g", "h", only the −1st-order beams enter the light-receiving surfaces DET 7' to DET 14' used for focus detection. However, since using the double-knife-edge method to detect the focusing error signal is desirable, no signal beam of light directly enters DET 7' to DET 14'. Instead, each signal beam is input between any two of the light-receiving surfaces DET 7' to DET 14'. The tracking error signal is detected using the commonly used DPP method and DPD method. The +1st-order light in the diffraction region "i" having the rectangular diffraction grating grooves enters the light-receiving surface DET 15', and the −1st-order light enters the light-receiving surface DET 16'.

Each signal level is obtained by arithmetic operations. That is to say:

a signal that is output from DET 5' via the current-voltage conversion amplifier 21 is defined as A', a signal that is output from DET 4' via the current-voltage conversion amplifier 22 is defined as B', a signal that is output from DET 6' via the current-voltage conversion amplifier 23 is defined as C', a signal that is output from DET 3' via the current-voltage conversion amplifier 24 is defined as D', a signal that is output from DET 1' via the current-voltage conversion amplifier 25 is defined as L', a signal that is output from DET 2' via the current-voltage conversion amplifier 26 is defined as M', a signal that is output via the current-voltage conversion amplifier 27 by internally interconnecting the light-receiving surfaces DET 15' and DET 16' is defined as R', a signal that is output via the current-voltage conversion amplifier 28 by internally interconnecting the light-receiving surfaces DET 8' and DET 14' is defined as F1', a signal that is output via the current-voltage conversion amplifier 29 by internally interconnecting the light-receiving surfaces DET 10' and DET 12' is defined as F2', a signal that is output via the current-voltage conversion amplifier 30 by internally interconnecting the light-receiving surfaces DET 9' and DET 11' is defined as F3', and a signal that is output via the current-voltage conversion amplifier 31 by internally interconnecting the light-receiving surfaces DET 7' and DET 13' is defined as F4'.

The information reproduction signal and the servo control signals can be obtained from the above output signals by the following arithmetic operations:

PP signal=L'−M',

Lens error signal=(A'+D')−(B'+C'),

DPP signal=PP signal−k* lens error signal=(L'−M')−k*{(A'+D')−(B'+C')},

Focusing error signal=(F1'+F3')−(F2'+F4'),

DPD signal=(Phase comparison between A' and B')+(Phase comparison between C' and D'), Information reproduction signal=A'+W+C'+D'+L'+M'+R'.

The output signals obtained are substantially the same as those of the first embodiment, so the interface configuration can also be the same as that of the first embodiment. In addition, although not shown, output signals from DET 15' and DET 16' can each be used as the photodetector position adjusting signal by placing the signals independently on the signal lines R1' and R2' respectively without interconnection of the outputs from DET 15' and DET 16'. This can be performed by providing terminals for signal output through R1' and R2' in addition to the interface configuration.

Briefly, in the present embodiment, using a beam-dividing element easier to manufacture than in the first embodiment makes it possible to suppress the nonuniformity of mass production of the beam-dividing element, thus stabilize the independent performance of the element itself, improve the manufacturing yield of the optical pickup device, reduce costs, and significantly reduce the amplification factor of the amplifiers to about 1.5. Thus, the optical pickup device becomes more resistant to disturbances such as interference due to multilayer stray light, improves over the device of the first embodiment in terms of the nonuniformity of performance on a mass-production basis, and provides more stable, higher recording/reproducing signal quality.

(Third Embodiment)

Next, a third embodiment is described below using FIGS. 7A, 7B, 8A, and 8B. The present embodiment provides an optical pickup device including a smaller number of current-voltage conversion amplifiers for information reproduction signal detection, than in the first embodiment, and hence capable of detecting a higher-quality information reproduction signal with less noise components.

The optical pickup device in the present embodiment can take substantially the same optical system configuration as that of the optical pickup device shown in FIG. 1, for example. The beam-dividing element 10 and the photodetector 11 adopted in the third embodiment are different in construction from those in the first embodiment. The configuration of the beam-dividing element 10, an essential part of the third embodiment, is described below using FIGS. 7A, 7B. In addition, the configuration of the photodetector 11, another essential part of the third embodiment, is described below using FIGS. 8A, 8B.

The configuration of the beam-dividing element can be substantially the same as that of the beam-dividing element in the conventional example discussed in the description of the first embodiment. The diffraction regions "a", "b", "c", "d", "e", "f", "g", "h", "i" are desirably of the same diffraction efficiency as achieved in the conventional example. The PP signal is detected from the +1st-order light of the diffraction regions "a" to "d", the lens error signal is detected from the +1st-order light of the diffraction regions "e" to "h", and the DPD signal is detected from the −1st-order light of the diffraction regions "e" to "h". Additionally, the focusing error signal is detected from the −1st-order light of the diffraction regions "a" to "d", and the information reproduction signal is detected from the +1st-order light of the diffraction regions "a" to "i". One feature of the third embodiment is that a new DPD signal using a peripheral region of the beam is detected from the −1st-order light side of lower luminous intensity. As described earlier, DPD signals are used to detect the timing in which the signal level changes, and the tracking error signal is obtained from the phase difference corresponding to the timing of the signal level change. Therefore, there is an advantage that even when the luminous intensity of the signal is low, if the timing of the signal level change is detected, an accurate tracking error signal can be obtained, which indicates that the DPD signal is more disturbance-resistant than the DPP signal whose change in luminous intensity directly becomes a tracking error signal. For this reason, the DPD signal to be detected from the beam periphery is detected using the −1st-order light of lower luminous intensity. Thus, it suffices that the PP signal and the lens shift signal are obtained from the +1st-order light side, so the number of current-voltage conversion amplifiers can be reduced to five, the same number as in the conventional example, by performing DET 1-4, DET 2-3, DET 5-7, and DET 6-8 light-receiving surface internal interconnections. Since the lens error signal is detected from the +1st-order light, an amplification factor "k" for the lens error signal can be reduced to about 1.5, which is substantially the same as in the first embodiment.

Figure 8A:
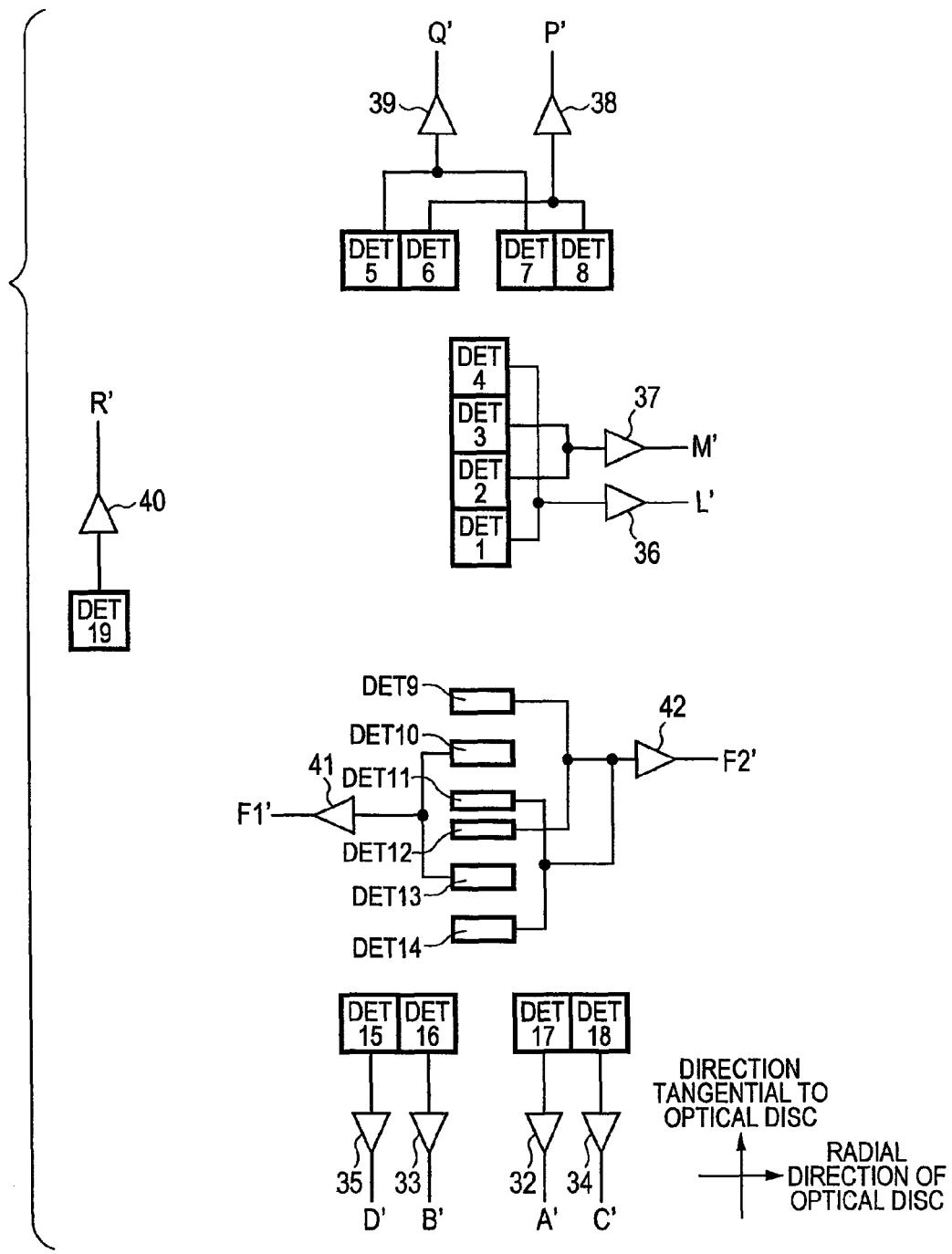
FIG. 8A is a schematic diagram of a photodetector configuration in the third embodiment.

FIG. 8A is a schematic diagram showing the configuration of the photodetector 11 in the present embodiment. Of all beams that have passed through the diffraction regions "a", "b", "c", "d", "e", "f", "g", "h", and "i", +1st-order beams of light enter the light-receiving surfaces DET 1, DET 4, DET 2, DET 3, DET 8, DET 6, DET 7, DET 5, DET 19, respectively. Of all beams that passed through the diffraction regions "e", "f", "g", "h", the −1st-order beams of light enter the light-receiving surfaces DET 15, DET 17, DET 16, DET 18, respectively. Of all beams that passed through the diffraction regions "a", "b", "c", "d", the −1st-order beams of light enter the light-receiving surfaces DET 9 to DET 14 used for focus detection. However, since using the double-knife-edge method to detect a focusing error signal is desirable, no signal beam directly enters the light-receiving surfaces DET 9 to DET 14. Instead, each signal beam is input between any two of the light-receiving surfaces DET 9 to DET 14.

Each signal can be obtained by arithmetic operations. That is to say:

a signal that is output from DET 17 via a current-voltage conversion amplifier 32 is defined as A', a signal that is output from DET 16 via a current-voltage conversion amplifier 33 is defined as B', a signal that is output from DET 18 via a current-voltage conversion amplifier 34 is defined as C', a signal that is output from DET 15 via a current-voltage conversion amplifier 35 is defined as D', an output signal from a current-voltage conversion amplifier 36, obtained by internally interconnecting DET 1 and DET 4, is defined as L', an output signal from a current-voltage conversion amplifier 37, obtained by internally interconnecting DET 2 and DET 3, is defined as M', an output signal from a current-voltage conversion amplifier 38, obtained by internally interconnecting DET 6 and DET 8, is defined as P', an output signal from a current-voltage conversion amplifier 39, obtained by internally interconnecting DET 5 and DET 7, is defined as Q', a signal that is output from DET 19 via a current-voltage conversion amplifier 40 is defined as R', a signal that is output via a current-voltage conversion amplifier 41 by internally interconnecting DET 10 and DET 13, is defined as F1', and a signal that is output via a current-voltage conversion amplifier 42 by performing internal interconnections between DET 9 and DET 11 and between DET 12 and DET 14 is defined as F2'.

The information reproduction signal and the servo control signals can be obtained from the above output signals by the following arithmetic operations:

PP signal=L'−M',
Lens error signal=P'−Q',
DPP signal=PP signal−k* lens error signal=(L'−M')−k*(P'−Q'),
Focusing error signal=F1'−F2',
DPD signal=(Phase comparison between A' and B')+(Phase comparison between C' and D'),
Information reproduction signal=L'+M'+P'+Q'+R'.

As described above, the DPD signal to be detected from the beam periphery is detected from the −1st-order light of lower luminous intensity. This allows signals to be output by performing the DET 1-4, DET 2-3, DET 5-7, and DET 6-8 internal interconnections, and thus the number of current-voltage conversion amplifiers to be reduced to five, the same number as in the conventional example.

In addition, the optical pickup device in the present embodiment desirably has the following interface configuration. That is to say, the interface configuration desirably includes at least 12 signal terminals: 4 signal terminals for output of the signals L', M, P', Q' required for DPP signal generation, 4 signal terminals for output of the signals A', B, C', D' required for the generation of the DPD signal to be detected from the light on the beam periphery, 2 signal terminals for output of the signals F1', F2' required for the generation of the focusing error signal, and 2 signal terminals for differential output of the information reproduction signal.

Figure 8B:
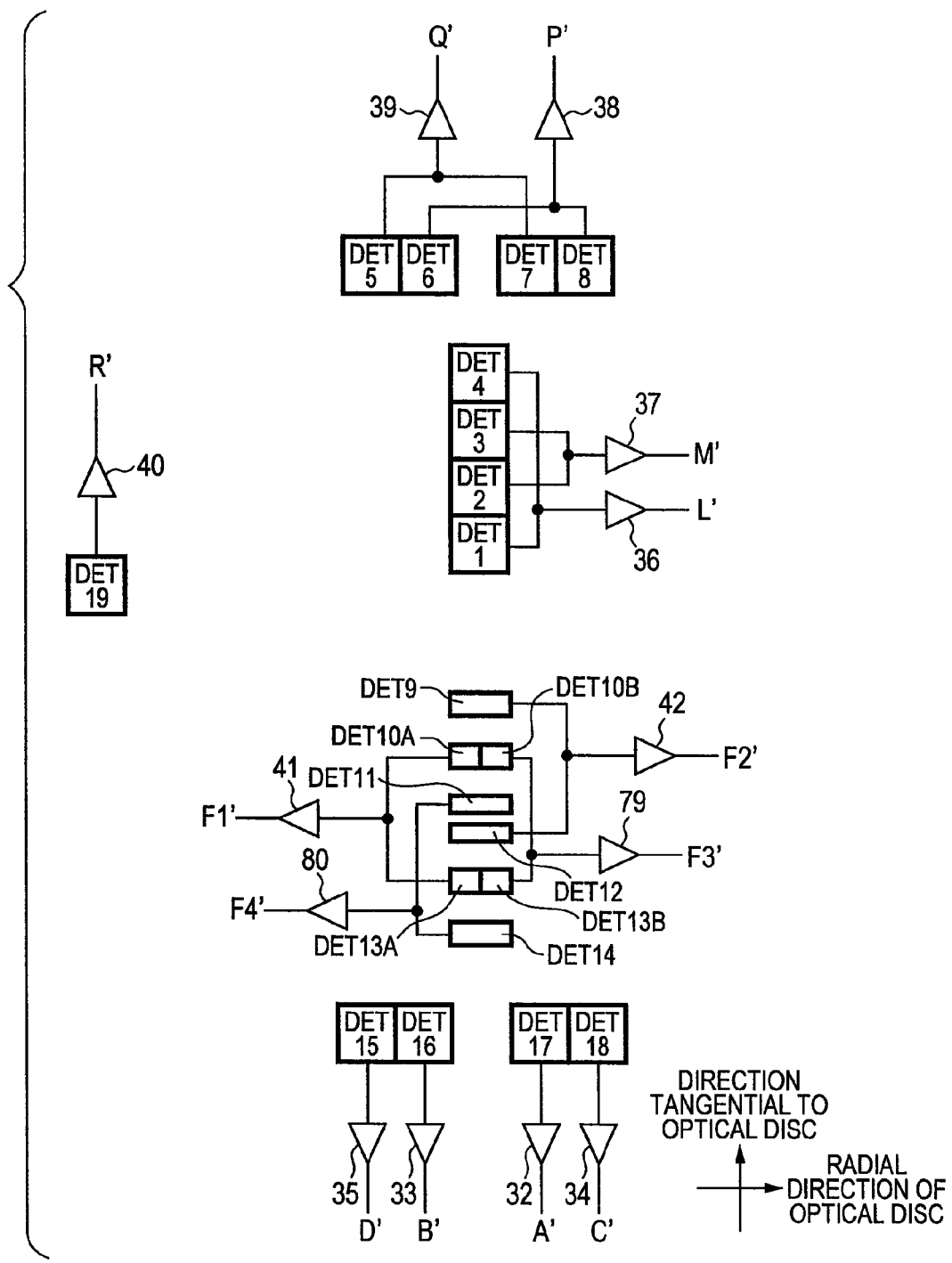
FIG. 8B is a schematic diagram of the photodetector configuration that enables detection of shifts in positions of the photodetector and beam spot in the third embodiment.
Figure 8C:
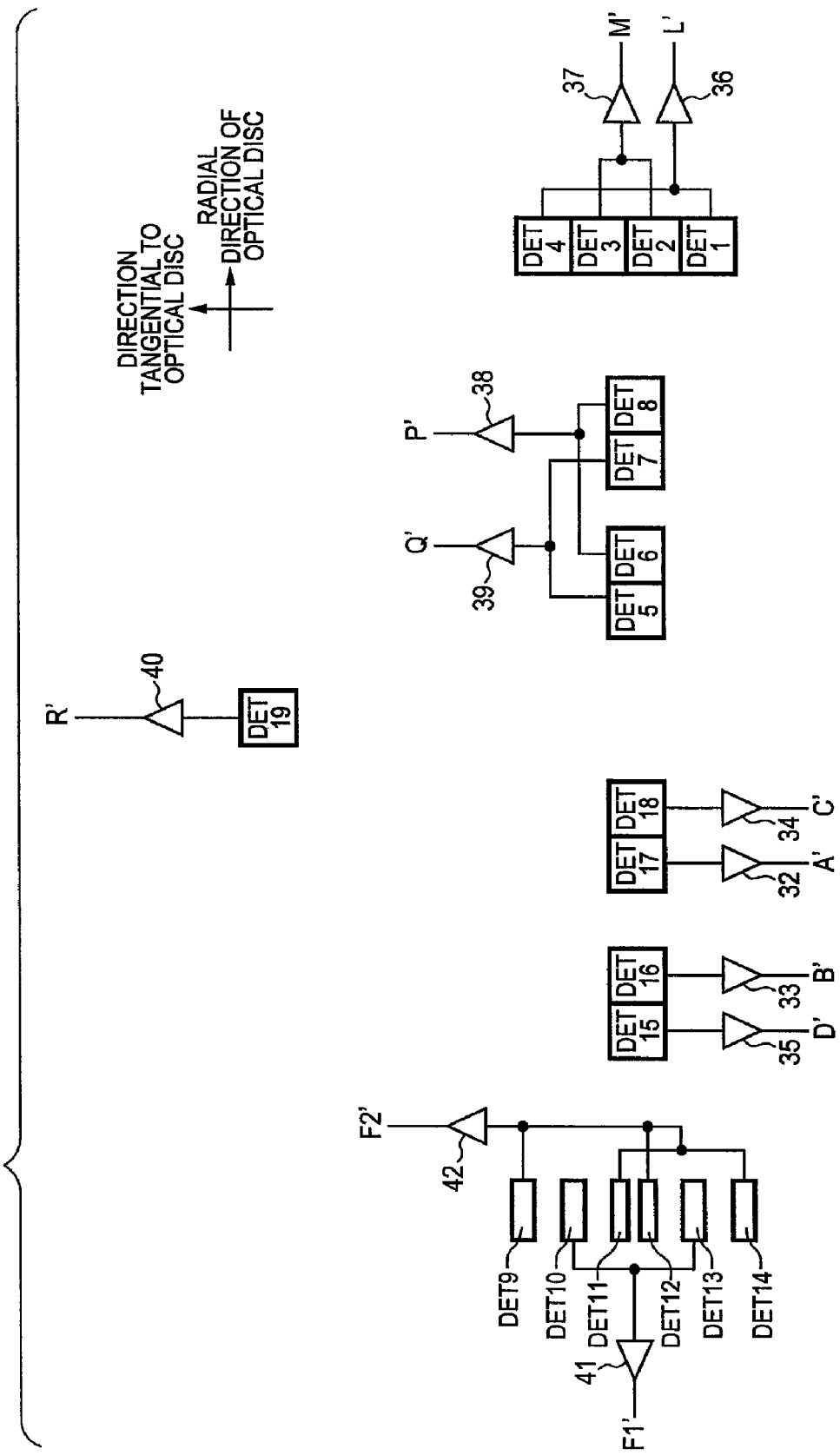
FIG. 8C is a schematic diagram showing an example of diverse photodetector configurations in the third embodiment.

Furthermore, the photodetector light-receiving surface layout pattern shown in FIG. 8B is considered for position adjustment of the photodetector. In FIG. 8B, the light-receiving surfaces DET 10 and DET 13 for detecting the focusing error signal are each divided into smaller regions by a dividing line. The photodetector light-receiving surface layout pattern and layout rules are set up to obtain the photodetector position adjusting signal by subdividing a part of the light-receiving surfaces in this way without departing from a range of the photodetector patterns and layout rules described heretofore. The method of dividing each light-receiving surface, however, is not limited to the form shown in FIG. 8B. For ease in the avoidance of affection of stray light, it is desirable that the layout of the light-receiving surfaces be based upon the basic configuration of the conventional example. Therefore, at least two light-receiving surfaces for detecting the +1st-order grating-diffracted light or −1st-order grating-diffracted light in the diffraction regions "e" to "h" are desirably arranged substantially in line in the direction substantially matching the direction equivalent to the radial direction of the optical disc. Similarly, at least two light-receiving surfaces for detecting the +1st-order grating-diffracted light or −1st-order grating-diffracted light in the diffraction regions "a" to "d" are desirably arranged substantially in line in the direction substantially matching the direction tangential to the optical disc. The layout of the light-receiving surfaces, therefore, is not limited to the layout patterns shown in FIGS. 8A and 8B. FIG. 8C is a schematic diagram showing an example of diverse light-receiving surface layout patterns. The layout pattern in FIG. 8C also satisfies the basic layout conditions necessary for the avoidance of stray light.

As shown in FIG. 8B, the light-receiving surface DET 10 is divided into two light-receiving surfaces, namely DET 10A and DET 10B, by providing one dividing line parallel to the direction tangential to the optical disc, on DET 10. Similarly, the light-receiving surface DET 13 is divided into light-receiving surfaces DET 13A and DET 13B by providing one dividing line parallel to the direction tangential to the optical disc, on DET 13.

A signal that is output via the current-voltage conversion amplifier 41 by internally interconnecting the light-receiving surfaces DET 10A and DET 13A is defined as F1', a signal that is output via the current-voltage conversion amplifier 42 by performing internal interconnections between the light-receiving surfaces DET 9B and DET 12 is defined as F2', a signal that is output via a current-voltage conversion amplifier 79 by internally interconnecting the light-receiving surfaces DET 10B and DET 13B is defined as F3', and a signal that is output via a current-voltage conversion amplifier 80 by internally interconnecting the light-receiving surfaces DET 11 and DET 14 is defined as F4'.

Signals for detecting any shifts in the position of the photodetector with respect to beam spots can be obtained by performing predetermined arithmetic operations using the signals F1' to F4'. The focusing error signal can be detected by (F1'+F3')−(F2'+F4') computation.

The interface configuration required can be obtained only by changing the section from which the signals for generating the focusing error signal are to be output. That is to say, the two signal terminals through which the signals F1', F2' are to be conducted require replacement with four signal terminals through which the signals F1', F2', F3', F4' are to be conducted. As described above, the number of signal terminals can be changed to any number within the scope of the present invention.

Next, a three-wave compatible optical pickup device is considered below. The number of signal terminals in the three-wave compatible optical pickup device can be reduced by adopting the interface configuration below to achieve device cost reduction. The optical systems to be used for two kinds of red/near-red discs can both be of the astigmatic detection type, as in the first embodiment, so since the output signals obtained are the same, the two optical systems can share one interface. More specifically, the interface can be configured with 10 signal terminals: 4 for output of the signal components of the main PP signal, the focusing error signal, and the DPD signal, 4 for output of the signal components of a sub-PP signal and the focusing error signal in the DAD scheme, and 2 for output of the information reproduction signal.

Next, for signal output pin sharing between the blue optical system and the red optical system, the DPD signal terminals through which high-frequency signals are to be conducted, desirably take higher priority for the sharing, from the standpoint of signal transmission characteristics. Accordingly, the two signal terminals for output of the information reproduction signal can be of common specifications. The signals lines A', B', C', D' through which the DPD signal components are to be conducted, and the four signal terminals for generating red/near-red disc DPD signals can also be made common in specifications to ensure matching in polarity.

In addition, after matching in polarity with the four signal terminals used to generate the sub-PP and DAD signals for the red optical system, the two or four signal terminals for generating the focusing error signal for blue discs can be shared with the former four signal terminals. The signal-receiving optical disc apparatus can selectively process signals for each common signal terminal by selecting an appropriate mode according to the type of optical disc being used for recording or reproduction.

The above description is limited to the interface configuration relating to the essential part of the present embodiment, that is, the section processing the servo signals and the information reproduction signal. For actual operation, the optical pickup device may further include a spherical aberration correcting element, an actuator drive, or other interface elements, in addition to the above interface.

In other words, the present embodiment provides an advantage that using −1st-order of light lower luminous intensity to detect the DPD signal that is to be usually detected at beam periphery reduces the number of current-voltage conversion amplifiers and renders the information reproduction signal lower in noise level and higher in quality than that achieved in the first embodiment. In addition, the amplification factor "k" of the amplifiers can be significantly reduced to about 1.5, which makes the optical pickup device highly resistant to disturbances such as interference due to multilayer stray light, allowing stabilized supply of high-quality recording/reproducing signals.

(Fourth Embodiment)

A fourth embodiment is described below using FIG. 9. In the present embodiment, using a beam-dividing element that is easier to manufacture than in the third embodiment suppresses nonuniformity of mass production of the beam-dividing element, thus stabilizing independent performance of the element itself, improving a manufacturing yield of the optical pickup device, and reducing costs.

The optical pickup device in the present embodiment can take substantially the same optical system configuration as that of the optical pickup device shown in FIG. 1, for example. The beam-dividing element 10 and the photodetector 11 adopted in the fourth embodiment are different in construction from those in the first embodiment. The configuration of the photodetector 11, an essential part of the fourth embodiment, is described below using FIG. 9.

In the optical system configuration of the first embodiment, the diffraction grating pitch in the diffraction region "i" tends to be minimal. As the diffraction grating pitch becomes narrow, manufacturing errors easily change diffraction efficiency. This causes the nonuniformity of performance between optical pickup devices, resulting in yield deterioration.

Accordingly, the present embodiment includes a region having a rectangular grating to generate the +1st-order light and −1st-order light that become equal in luminous intensity only in the diffraction region "i". Compared with the blazed grating employed in the first embodiment, the rectangular grating is very easy to fabricate and suppresses the nonuniformity of performance significantly. Shapes of each diffraction region can be substantially the same as in the first embodiment.

Figure 9:
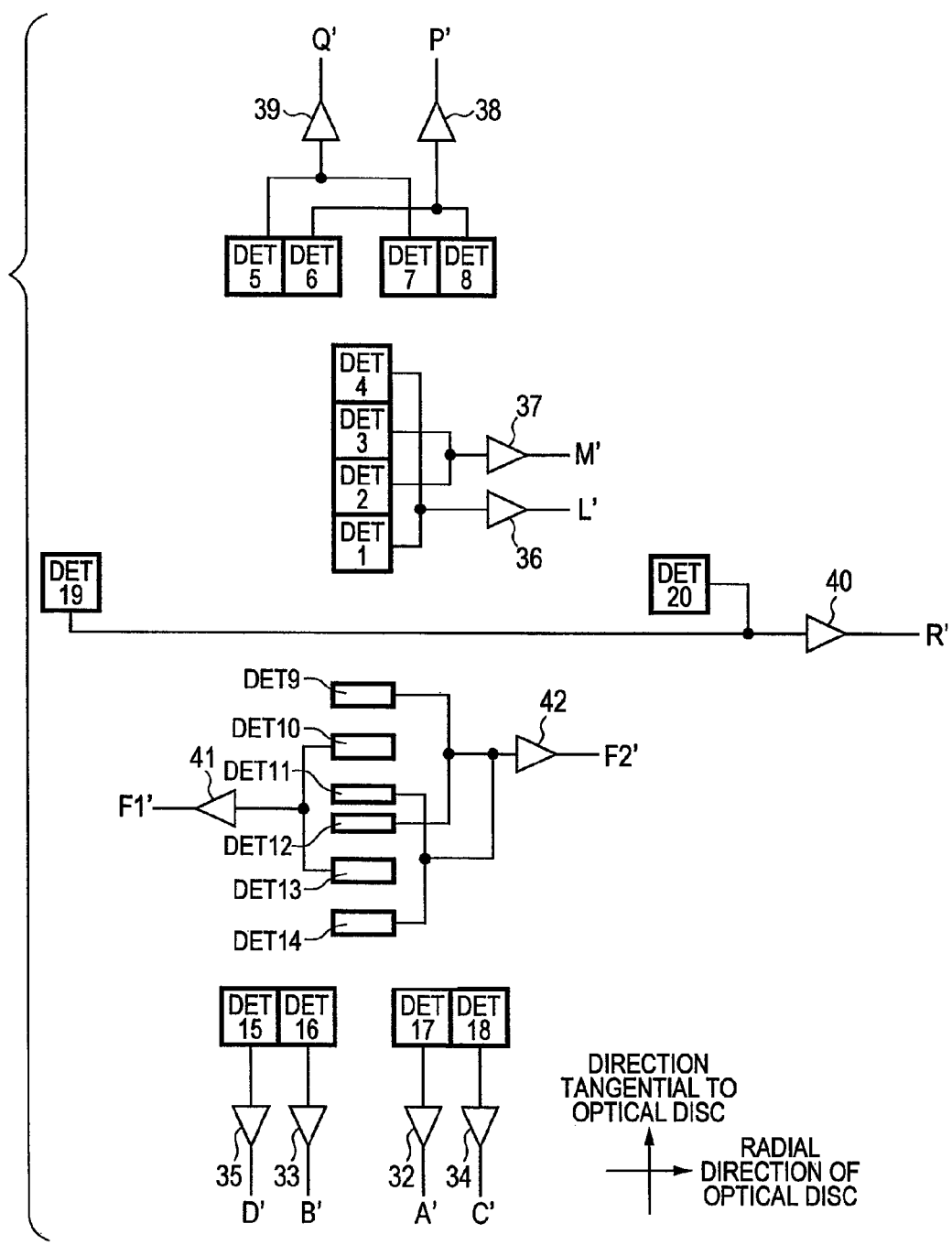
FIG. 9 is a schematic diagram of a photodetector configuration in a fourth embodiment.

FIG. 9 is a schematic diagram showing an example of a photodetector configuration employing the rectangular grating in the diffraction region "i". A difference from the third embodiment exists in a configuration of the light-receiving surfaces which receive beams from the diffraction region "i". Since the amount of light is equally allocated to +/−1st-order beams with the diffraction region "i" as the rectangular grating, the luminous intensity of the +1st-order light decreases, compared with the equivalent in the first embodiment. For this reason, DET 20 is added and the −1st-order light of the diffraction region "i" that consequently increases in luminous intensity is also detected. In addition, the light that passes through between DET 19 and DET 20 can be output as the signal R' by internally interconnecting DET 19 and DET 20, so there is no need to add a current-voltage conversion amplifier. Light-receiving surfaces other than DET 19 and DET 20 have only to assume such a layout that the basic configuration conditions necessary for avoiding stray light are satisfied, as in the third embodiment.

Other diffraction regions can be made substantially the same as those of the first embodiment in terms of light-receiving surface–diffraction region association, internal interconnections, and signal level computing method. More specifically, of all beams of light that have passed through the diffraction regions "a", "b", "c", "d", "e", "f", "g", "h", only the +1st-order beams enter the respective light-receiving surfaces, namely, DET 1, DET 4, DET 2, DET 3, DET 8, DET 6, DET 7, and DET 5, respectively. Likewise, of all the beams of light that passed through the diffraction regions "e", "f", "g", "h", only the −1st-order beams enter the light-receiving surfaces DET 15, DET 17, DET 16, DET 18, respectively. Of all the beams of light that passed through the diffraction regions "a", "b", "c", "d", −1st-order beams enter DET 9 to DET 14 used for focus detection. However, since using the double-knife-edge method to detect the focusing error signal is desirable, no signal beam of light directly enters DET 9 to DET 14. Instead, each signal beam is input between any two of the light-receiving surfaces DET 9 to DET 14. The tracking error signal is detected using the commonly used DPP method and DPD method. The +1st-order light in the diffraction region "i" having the rectangular diffraction grating grooves enters the light-receiving surface DET 19, and the −1st-order light enters the light-receiving surface DET 20.

Each signal level is obtained by arithmetic operations. That is to say:

a signal that is output from DET 17 via the current-voltage conversion amplifier 32 is defined as A', a signal that is output from DET 16 via the current-voltage conversion amplifier 33 is defined as B', a signal that is output from DET 18 via the current-voltage conversion amplifier 34 is defined as C', a signal that is output from DET 15 via the current-voltage conversion amplifier 35 is defined as D', an output signal from the current-voltage conversion amplifier 36, obtained by internally interconnecting DET 1 and DET 4, is defined as L', an output signal from the current-voltage conversion amplifier 37, obtained by internally interconnecting DET 2 and DET 3, is defined as M', an output signal from the current-voltage conversion amplifier 38, obtained by internally interconnecting DET 6 and DET 8, is defined as P', an output signal from the current-voltage conversion amplifier 39, obtained by internally interconnecting DET 5 and DET 7, is defined as Q', an output signal from the current-voltage conversion amplifier 40, obtained by internally interconnecting DET 19 and DET 20, is defined as R', a signal that is output via the current-voltage conversion amplifier 41 by internally interconnecting DET 10 and DET 13 is defined as F1', and a signal that is output via the current-voltage conversion amplifier 42 by internally interconnecting DET 9 and DET 11 and internally interconnecting DET 12 and DET 14 is defined as F2'.

The information reproduction signal and the servo control signals can be obtained from the above output signals by the following arithmetic operations:

PP signal=L'−M',

Lens error signal=P'−Q',

DPP signal=PP signal−k* Lens error signal=(L'−M')−k*(P'−Q'),

Focusing error signal=F1'−F2,

DPD signal=(Phase comparison between A' and B')+(Phase comparison between C' and D'), Information reproduction signal=L'+M'+P'+Q'+R'.

The output signals obtained are substantially the same as those of the third embodiment, so the interface configuration can also be the same as that of the third embodiment. In addition, although not shown, output signals from DET 19 and DET 20 can each be used as the position adjusting signal for the photodetector by placing the signals independently on the signal lines R1 and R2 respectively without interconnection of the outputs from DET 19 and DET 20. This can be performed by providing terminals for signal output through R1 and R2 in addition to the interface configuration.

Briefly, in the present embodiment, using a beam-dividing element easier to manufacture than in the third embodiment makes it possible to suppress the nonuniformity of mass production of the beam-dividing element, thus stabilize the independent performance of the element itself, improve the manufacturing yield of the optical pickup device, reduce costs, and significantly reduce the amplification factor of the amplifiers to about 1.5. Thus, the optical pickup device becomes more resistant to disturbances such as interference due to multilayer stray light, improves in the nonuniformity of device performance on a mass-production basis, and provides more stable, higher recording/reproducing signal quality.

(Fifth Embodiment)

Figure 10:
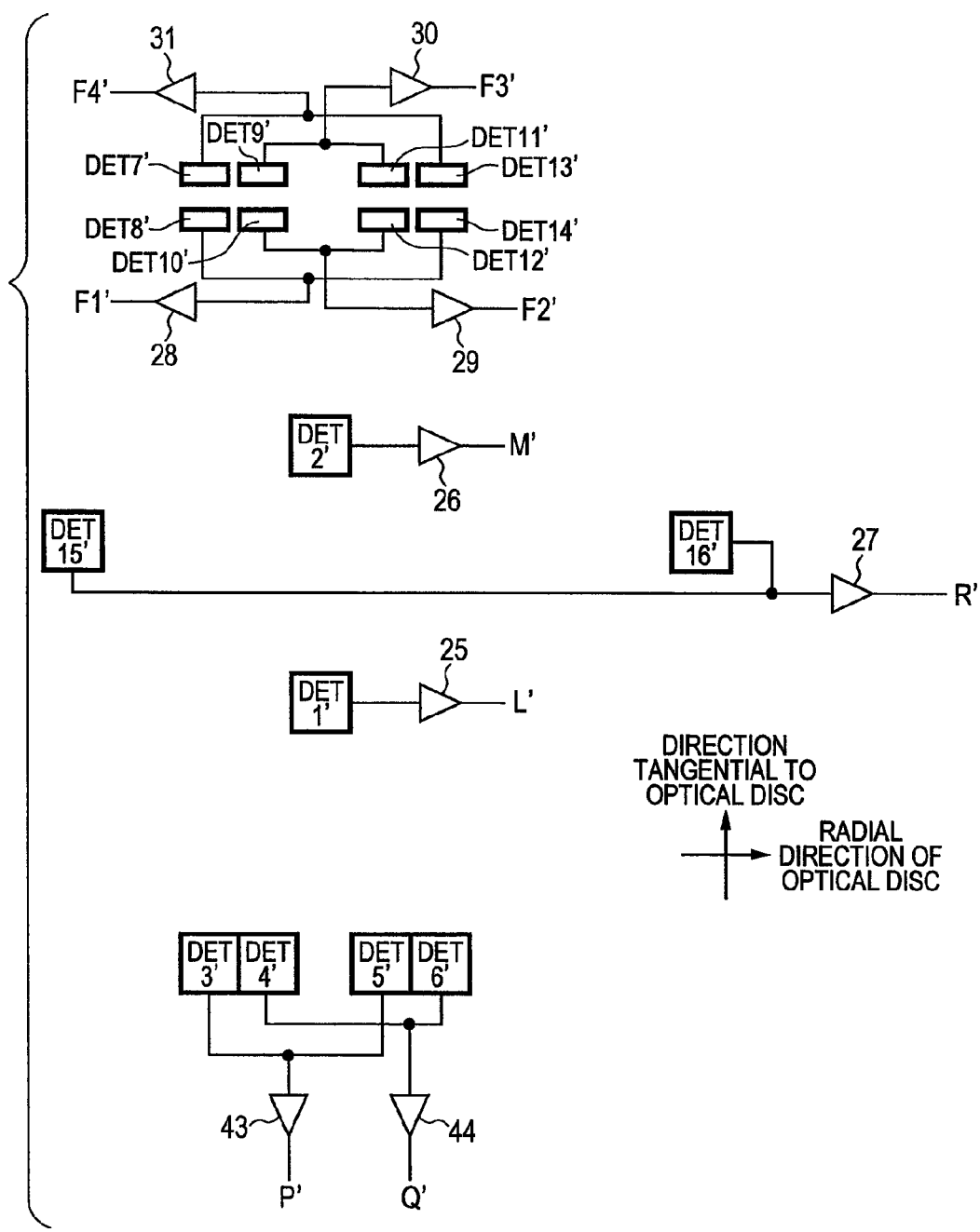
FIG. 10 is a schematic diagram of a photodetector configuration in a fifth embodiment.

Next, a fifth embodiment is described below using FIG. 10. The present embodiment provides an optical pickup device including a smaller number of current-voltage conversion amplifiers for information reproduction signal detection, than in the first embodiment, and hence capable of detecting a higher-quality information reproduction signal with less noise components.

The optical pickup device in the present embodiment can take substantially the same optical system configuration as that of the optical pickup device shown in FIG. 1, for example. The photodetector 11 adopted in the fifth embodiment is different in construction from that in the first embodiment. FIG. 10 shows the photodetector 11, an essential part of the fifth embodiment. The PDP signal is of a tracking error signal detection scheme assuming a ROM disc. The DPD signal detects a phase difference due to a change in luminous intensity, and the change in luminous intensity is brought about by a recording pit formed on the ROM disc. This is why the tracking error signal detection scheme is employed for the PDP signal. However, for example, Blu-ray discs (hereinafter, referred to as BDs) do not always require DPD signal detection since ROM discs support the DPP scheme, even for the ROM disc specifications. The optical pickup device of the present embodiment, therefore, is intended to further increase internal interconnections between light-receiving surfaces, thus reduce the number of current-voltage conversion amplifiers required, and information reproduction signal noise components, by detecting the tracking error signal of the DPP scheme, even for the ROM disc, instead of conducting the DPD signal detection itself. The beam-dividing element can be substantially the same as in the first and second embodiments. The layout of the photodetector light-receiving surfaces can also be substantially the same as in the first and second embodiments. Another difference from the first and second embodiments exists in the method of internal interconnection from the light-receiving surfaces DET 3'-6' to current-voltage conversion amplifiers 43 and 44. FIG. 10 shows an example of a light-receiving surface layout pattern in which rectangular diffraction grating grooves are formed in the diffraction region "i".

A signal that is output via the current-voltage conversion amplifier 43 by internally interconnecting DET 3 and DET 5' is defined as P', and a signal that is output via the current-voltage conversion amplifier 44 by internally interconnecting DET 4 and DET 6' is defined as Q'.

Thus, the lens error signal is generated by (P'−Q') computation, and the information reproduction signal is generated by (L'+M'+P'+q'+R') computation. Methods of internal interconnection and signal level computation of other sections can be substantially the same as in the first and second embodiments.

In addition, the optical pickup device in the present embodiment has the following interface configuration. The interface includes at least 10 signal terminals: 4 for output of the signals L', M', P', Q' required for the generation of the DPP signal, 4 for output of the signals F1', F2', F3', F' required for the generation of the focusing error signal, and 2 for differential output of the information reproduction signal.

Next, an optical pickup device compatible among three types of media is considered below. Establishing the following interface configuration in the compatible optical pickup device suppresses the number of signal terminals and reduces device costs. That is to say, since the DVD system and CD system adopted in the device are both of the astigmatic detection type, the output signals obtained are the same and the two systems can share one interface. More specifically, the interface is configured with a total of 10 signal terminals: 4 for output of the signal components useable to generate the main PP signal, the focusing error signal, and the DPD signal, 4 for output of the components useable to generate the sub-PP signal and the focusing error signal of the DAD scheme, and 2 for differential output of the information reproduction signal.

Next, sharing between blue-light beam signal output terminals and red-light beam signal terminals in a three-wave compatible optical pickup device is considered below. The two signal terminals for the information reproduction signal in the blue-light optical system can be shared with the two signal terminals for the information reproduction signal in the red-light optical system. Also, the four signal terminals through which the focusing error signal component of blue light are to be conducted can be shared with the four signal terminals through which the sub-PP and DAD signal components of red light are to be conducted. The number of signal terminals in an interface configuration for the three-wave compatible optical pickup device, therefore, can be reduced to 14. The optical disc apparatus that receives signals from the optical pickup device can selectively process each signal according to the kind of common signal terminal by selecting a mode appropriate for the type of optical disc being used.

The above description is limited to the interface configuration relating to the essential part of the present embodiment, that is, the section processing the servo signals and the information reproduction signal. For actual operation, the optical pickup device may further include a spherical aberration correcting element, an actuator drive, or other interface elements, in addition to the above interface.

Dividing each light-receiving surface of the photodetector into even smaller regions to adjust a position of the photodetector allows photodetector position adjusting signals to be detected. The light-receiving surfaces can be arranged in substantially the same pattern as that shown in FIG. 5B, for example. The light-receiving surfaces DET 7', DET 10', DET 12', DET 14' for detecting the focusing error signal are each divided into smaller regions. Therefore, only the output signal lines F1', F2', F3', F4' for generating the focusing error signal need rerouting.

A signal that is output via the current-voltage conversion amplifier 28 by internally interconnecting DET 8' and DET 14' is defined as F1', a signal that is output via the current-voltage conversion amplifier 29 by conducting internal interconnections between DET 7'B and DET 10'B and between DET 12'B and DET 13'B is defined as F2', a signal that is output via the current-voltage conversion amplifier 30 by internally interconnecting DET 9' and DET 11' is defined as F3', and a signal that is output via the current-voltage conversion amplifier 31 by conducting internal interconnections between DET 7'A and DET 10'A and between DET 12'A and DET 13'A is defined as F4'.

Signals for detecting any shifts in the position of the photodetector with respect to beam spots can be obtained by performing predetermined arithmetic operations using the signals F1' to F4'. The focusing error signal can be detected by (F1'+F3')−(F2'+F4') computation.

Neither the number of signals output, nor a method of computation for the signals obtained after being output is changed in the photodetector configuration of FIG. 5B. The interface of the optical pickup device that covers a range including the compatibility with red/near-red optical discs can therefore be configured substantially in the same method as that of the above interface. The light-receiving surface dividing method described above, however, is not limited to the above.

The number of current-voltage conversion amplifiers likely to affect the information reproduction signal can be reduced from seven to five by adopting the configuration described above. Briefly, the present embodiment is advantageous in that an information reproduction signal lower in noise level and higher in quality than in the first embodiment can be obtained.

(Sixth Embodiment)

FIG. 11 is a schematic diagram of an optical disc apparatus including one of the optical pickup devices according to the first to fifth embodiments. Reference numeral 8 denotes an optical disc, 910 a laser activation circuit, 920 the optical pickup device, 930 a spindle motor, 940 a spindle motor driving circuit, 950 an access control circuit, 960 an actuator driving circuit, 970 a servo signal generating circuit, 980 an information signal reproducing circuit, 990 an information signal recording circuit, and 900 a control circuit. The control circuit 900, the servo signal generating circuit 970, and the actuator driving circuit 960 control an actuator in response to an output signal from the optical pickup 920. The output signal from the optical pickup device in the present embodiment is used for actuator control, whereby information is recorded and reproduced stably and with high accuracy.

The optical pickup device used in the present embodiment is not limited to or by the optical system shown in FIG. 1, or to or by the optical system configurations or light-receiving surface configurations described in the above embodiments.

Use of the device or apparatus constituent elements described above yields high recording or reproducing signal quality when information is recorded on or reproduced from multilayered optical discs.

While embodiments of the optical pickup device according to the present invention and of the optical disc apparatus using the device have been described above, the invention is not limited to the embodiments and may be improved and modified in various respects and forms without departing from the scope of the invention. In other words, the embodiments have been set forth for ease in the description of the invention and are not necessarily limited to devices or apparatuses equipped with all of the described constituent elements. In addition, part of the configuration of an embodiment can be replaced with the configuration of another embodiment. Furthermore, part of the constituent elements of each embodiment may be formed by adding, deleting, or substituting other constituent elements.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications that fall within the ambit of the invention.

What is claimed is:

1. An optical pickup device comprising:
    a laser light source;
    an objective lens that converges a laser beam emitted from the laser light source, upon an optical disc;
    a beam-dividing element that divides a signal beam reflected from the optical disc, into a plurality of beams; and
    a photodetector including a plurality of light-receiving surfaces each formed to receive a part of the signal beams obtained by the division;
    wherein:
    the beam-dividing element divides the reflected signal beam into at least two beams of light, one thereof including a push-pull signal region and one not including the push-pull signal region;
    the photodetector detects, of all the signal beams obtained by the division, a beam present in a beam-peripheral region free of the beam including the push-pull signal region;
    a detection signal obtained from the beam present in the beam-peripheral region is used to output a source signal for generating a DPD signal that acts as a tracking error signal; and
    a signal terminal that outputs a source signal for generating a lens error signal is capable of outputting a source signal for generating a DPD signal detected from the beam present in the beam-peripheral region.

2. The optical pickup device according to claim 1, further comprising:
    an interface configured with at least 12 signal terminals;
    wherein the 12 signal terminals include:
    two signal terminals that output a source signal for generating a push-pull signal;
    four signal terminals that output a lens error signal component and DPD signal component with a push-pull signal component excluded;
    four signal terminals that output a source signal for generating a focusing error signal; and
    two signal terminals that output a source signal for generating an information reproduction signal.

3. The optical pickup device according to claim 1, wherein:
the photodetector is assigned a gain level to use a current-voltage conversion amplifier to amplify signal levels of signals detected on each light-receiving surface, and in order to generate an information reproduction signal, to conduct signal attenuation when a summing operational amplifier conducts an adding operation upon detection signals obtained after the signal amplification with the current-voltage conversion amplifier.

4. The optical pickup device according to claim 1, further including:
a function that reproduces various information signals recorded on a plurality of recording layers provided at a predetermined pitch on the optical disc, and a function that records each of the information signals on each of the recording layers.

5. An optical disc apparatus comprising:
the optical pickup device according to claim 1;
a laser activation circuit that drives the laser light source within the optical pickup device;
a servo signal generating circuit that generates a focusing error signal and a tracking error signal from signals detected from the photodetector within the optical pickup device; and
an information signal reproducing circuit that reproduces an information signal recorded on an optical disc.

6. The optical disc apparatus according to claim 5, further including:
a function that reproduces various information signals recorded on a plurality of recording layers provided at a predetermined pitch on the optical disc, and a function that records each of the information signals on each of the recording layers.

7. An optical pickup device comprising:
a laser light source;
an objective lens that converges a laser beam emitted from the laser light source, upon an optical disc;
a beam-dividing element that divides a signal beam reflected from the optical disc, into a plurality of beams; and
a photodetector including a plurality of light-receiving surfaces each formed to receive a part of the signal beams obtained by the division;
wherein:
the beam-dividing element divides the reflected signal beam into at least two beams of light, one thereof including a push-pull signal region and one not including the push-pull signal region;
the photodetector detects, of all the signal beams obtained by the division, a beam present in a beam-peripheral region free of the beam including the push-pull signal region;
a detection signal obtained from the beam present in the beam-peripheral region is used to output a source signal for generating a DPD signal that acts as a tracking error signal; and
the optical pickup device being of a three-wave compatible type adapted to record information upon and reproduce information from three kinds of media (first, second, and third kinds of media) that differ from one another in wavelength of light,
the three-wave compatible optical pickup device comprising:
a predetermined optical system configuration for recording information upon or reproducing information from the second and third kinds of media; and
an interface configured with a plurality of signal terminal groups concerned with information recording upon and reproduction from the second and third kinds of media;
wherein:
a first signal terminal group in the interface configuration includes signal terminals formed to, during information recording upon or reproduction from the first kind of medium, output a source signal for generating the DPD signal detected from the beam present in the beam-peripheral region;
a second signal terminal group in the interface configuration includes signal terminals formed to, during information recording upon or reproduction from the second and third kinds of media, output a source signal for generating a DPD signal;
a third signal terminal group in the interface configuration includes signal terminals formed to, during information recording upon or reproduction from the first kind of medium, output a source signal for generating a focusing error signal; and
a fourth signal terminal group in the interface configuration includes signal terminals formed to, during information recording upon or reproduction from the second and third kinds of media, output a source signal for generating a subsidiary push-pull signal;
the first signal terminal group being shared with the second signal terminal group, and the third signal terminal group being shared with the fourth signal terminal group.

* * * * *